United States Patent
Parikh et al.

(10) Patent No.: US 11,775,852 B2
(45) Date of Patent: Oct. 3, 2023

(54) NETWORK OPTIMIZATION

(71) Applicant: ACCENTURE GLOBAL SOLUTIONS LIMITED, Dublin (IE)

(72) Inventors: Ashesh Parikh, Frisco, TX (US); Afzal Husain, Parker, TX (US); Alon Arad, Sugarland, TX (US); Suresh Aswathnarayana, Mukiltoe, WA (US); Ragnar-Miguel Myhrer, Madison, NJ (US); Tejas Rao, Toronto (CA); Sharad Sachdev, Glen Head, NY (US); Joshua Intriligator, New York, NY (US); Scott Andrew Alfieri, Chester, NJ (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1070 days.

(21) Appl. No.: 16/555,375

(22) Filed: Aug. 29, 2019

(65) Prior Publication Data
US 2021/0065031 A1 Mar. 4, 2021

(51) Int. Cl.
*G06N 7/00* (2023.01)
*G06F 16/903* (2019.01)
(Continued)

(52) U.S. Cl.
CPC ............. *G06N 7/01* (2023.01); *G06F 16/906* (2019.01); *G06F 16/9024* (2019.01); *G06F 16/90335* (2019.01)

(58) Field of Classification Search
CPC ............ G06F 16/906; G06F 16/90335; G06F 16/9024; G06N 7/01
See application file for complete search history.

(56) References Cited

U.S. PATENT DOCUMENTS 7,561,876 B2   7/2009 Chiou et al.
11,314,554 B2* 4/2022 Bohacek ............... G06F 9/5061
(Continued)

OTHER PUBLICATIONS

Gonzalez-Brevis et al., "Base Station Location Optimization for Minimal Energy Consumption in Wireless Networks", School of Mathematics, University of Edinburgh The King's Buildings, Edinburgh, EH9 3JZ, UK Technical Report ERGO 10-002, Mar. 10, 2010, 6 pages.

(Continued)

*Primary Examiner* — Tamara T Kyle
*Assistant Examiner* — Lahcen Ennaji
(74) *Attorney, Agent, or Firm* — Mannava & Kang, P.C.

(57) ABSTRACT

A system may receive a cluster prediction requirement. The system may determine a first node conglomerate by sorting a first dataset into a first plurality of nodes. The system may determine a plurality of attributes by sorting a second dataset associated with the cluster prediction requirement. The system may determine a second node conglomerate for each of the plurality of attributes. A node confidence score may be assigned to each of the second plurality of nodes. The system may determine a node graph based on a comparison between the first node conglomerate and the second node conglomerate. The node graph may be iteratively modified based on a node optimization threshold value to generate a harmonized node graph. The node optimization threshold value may be based on a map confidence score allotted to the node graph.

17 Claims, 22 Drawing Sheets

(51) Int. Cl.
  *G06F 16/906* (2019.01)
  *G06F 16/901* (2019.01)
  *G06N 7/01* (2023.01)

(56) References Cited

U.S. PATENT DOCUMENTS

2014/0108322 A1* 4/2014 Buchanan ................ G06N 5/02
  706/50
2019/0364130 A1* 11/2019 Rogynskyy ........... G06F 16/178

OTHER PUBLICATIONS

Ibrahim et al., "Enhancing Clustering Algorithm to Plan Efficient Mobile Network", International Journal of Computer Applications, vol. 59, No. 18, Dec. 2012, pp. 18-24.
Al-kaboudei Abdulqader, "Radio planning with Atoll", May 18, 2012, 63 pages.
Julius Caesar Puoza et al., "Simulated Annealing in Telecommunication Network Planning", Research Journal of Information Technology, Mar. 20, 2011, pp. 6-13.

* cited by examiner

| Coordinate LAT | Coordinate LON | Required Network Bandwidth (Mbit/s) |
|---|---|---|
| 32.947805 | -96.813389 | 3.00 |
| 32.953759 | -96.808985 | 3.00 |
| 32.948332 | -96.810178 | 3.00 |
| 32.951125 | -96.80836 | 3.00 |
| 32.953595 | -96.810444 | 0.49 |
| 32.947936 | -96.828479 | 0.98 |
| 32.954309 | -96.826063 | 0.98 |
| 32.953826 | -96.826269 | 0.98 |
| 32.954213 | -96.822844 | 1.46 |
| 32.954147 | -96.817125 | 1.95 |
| 32.952363 | -96.818638 | 0.98 |

614

600B

Data Base/CSV/ Blobby Input 602

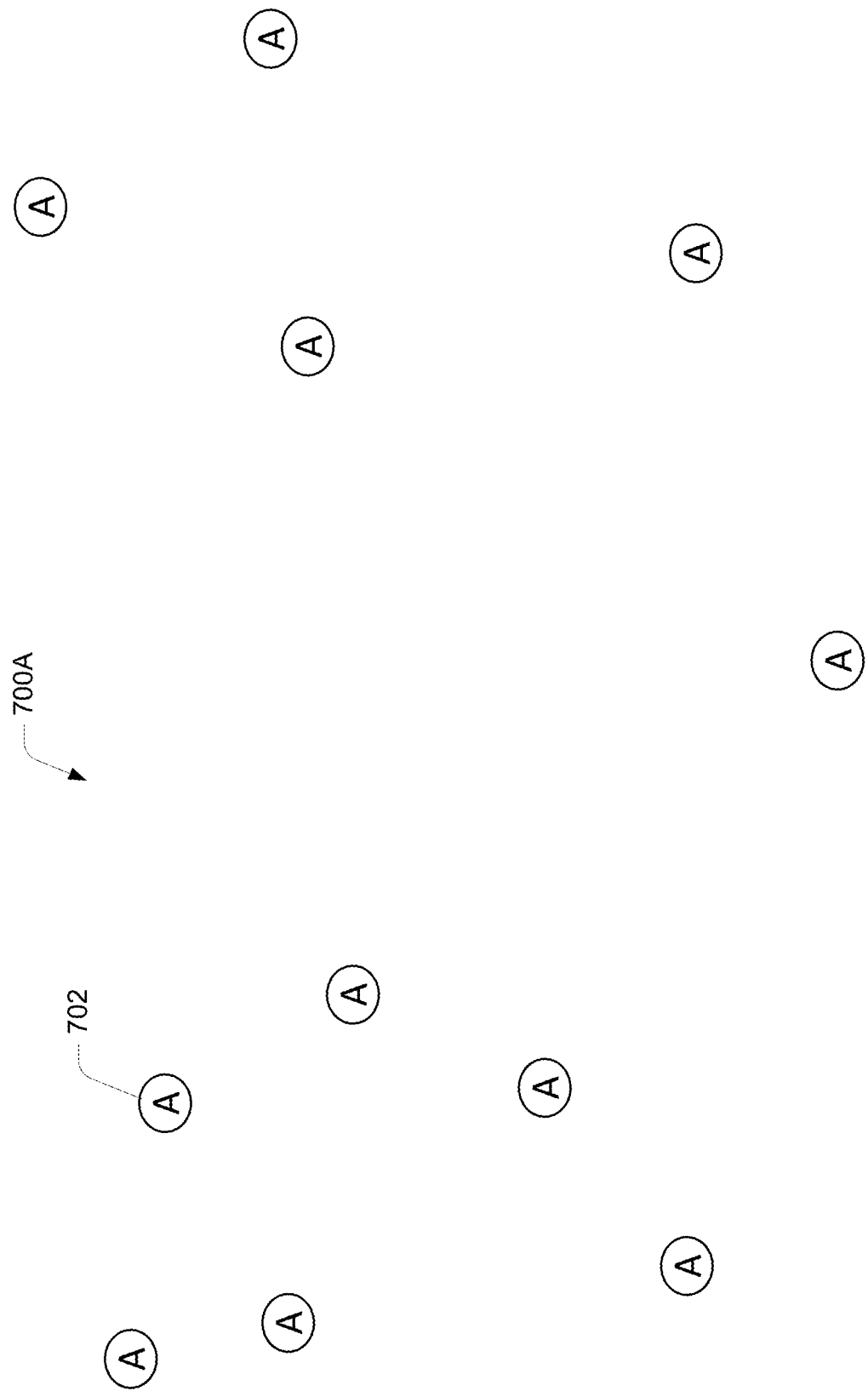

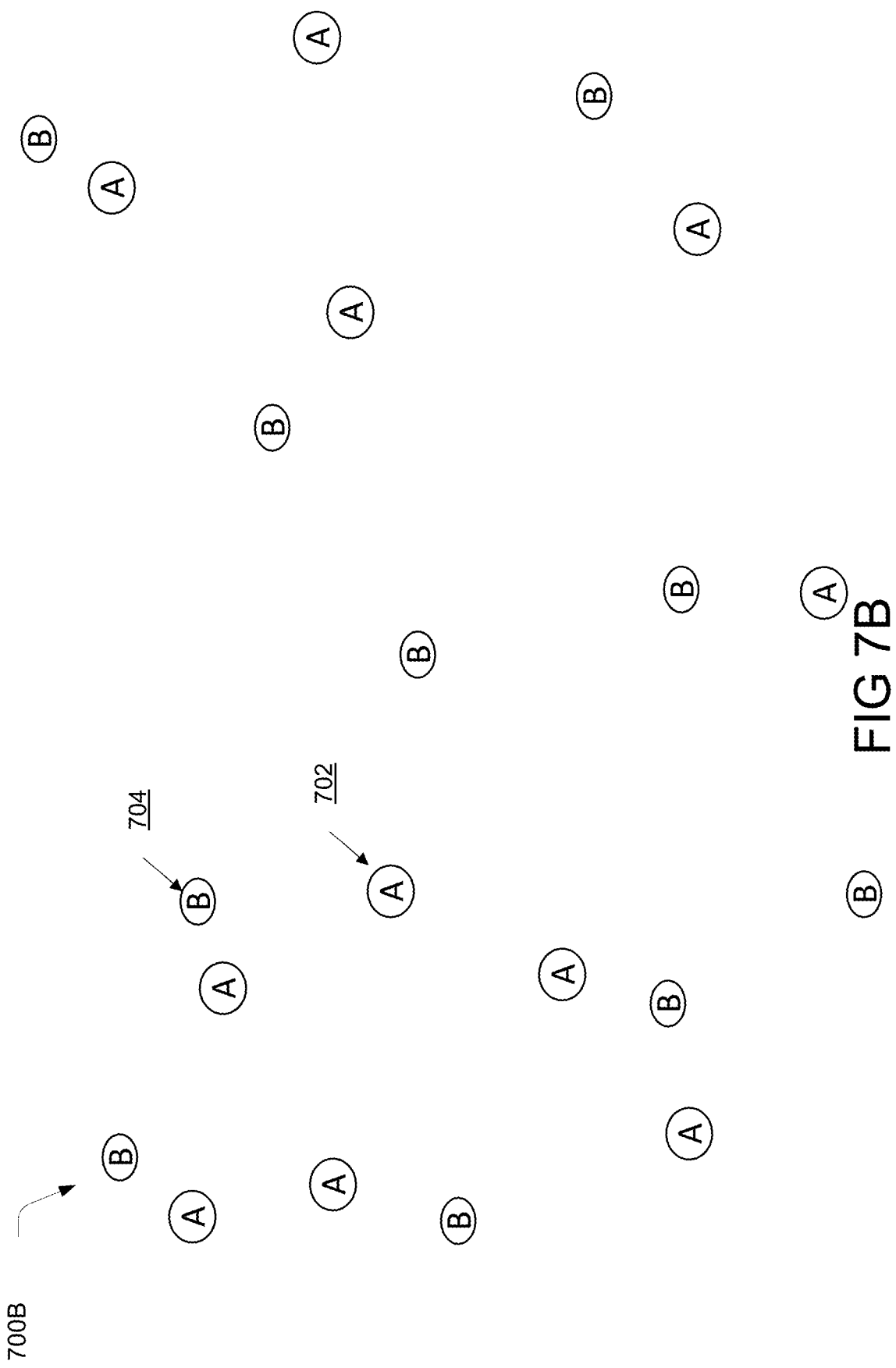

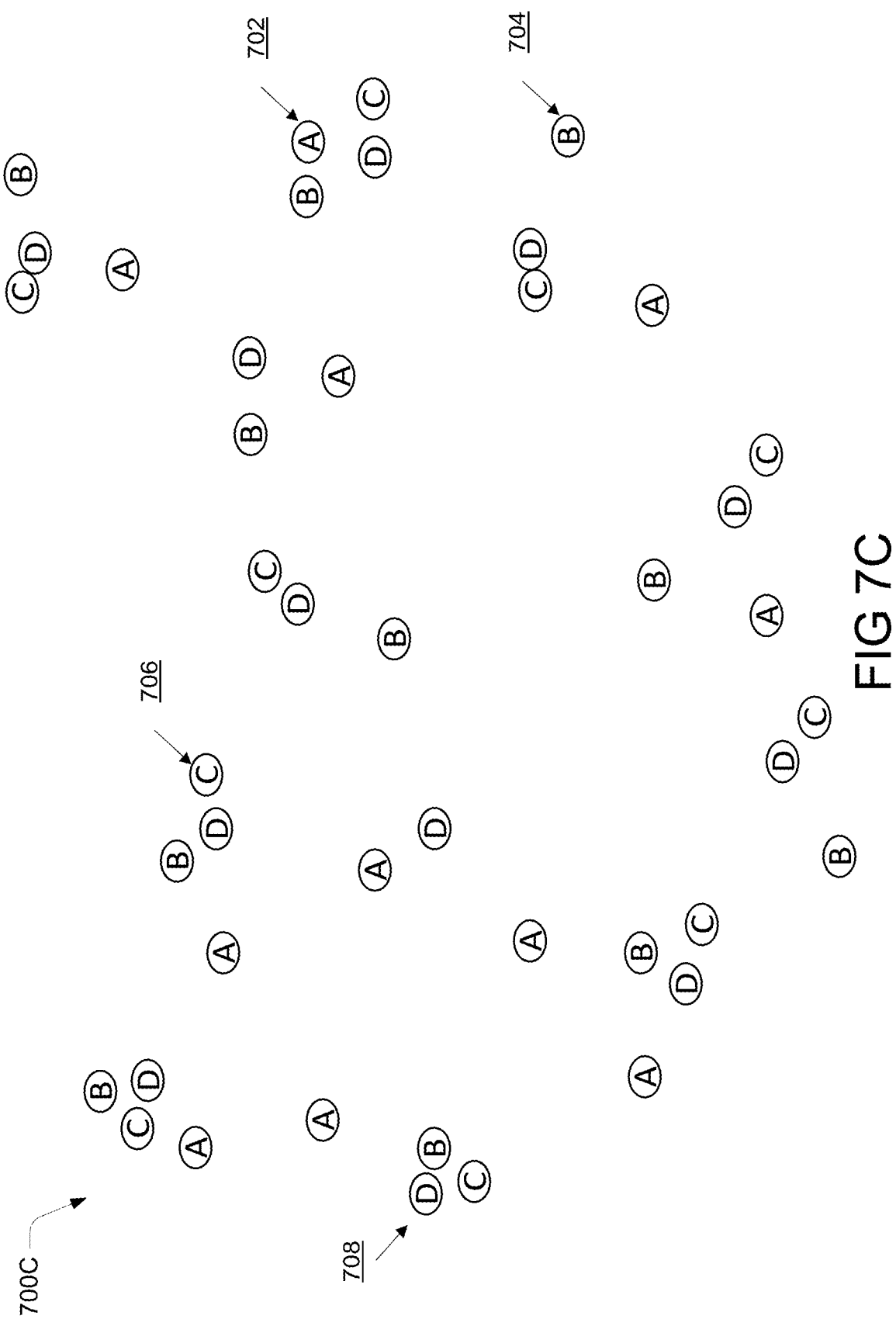

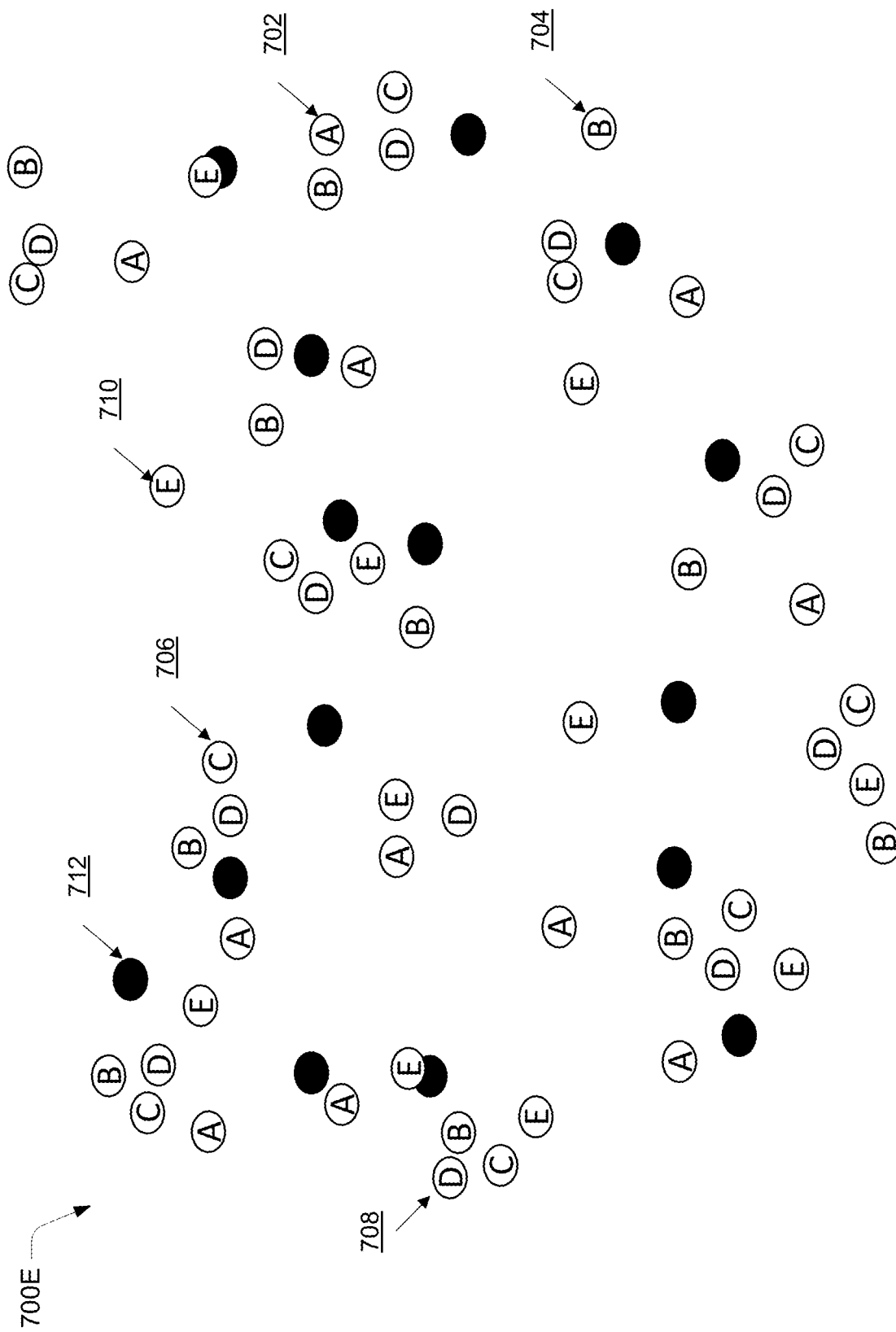

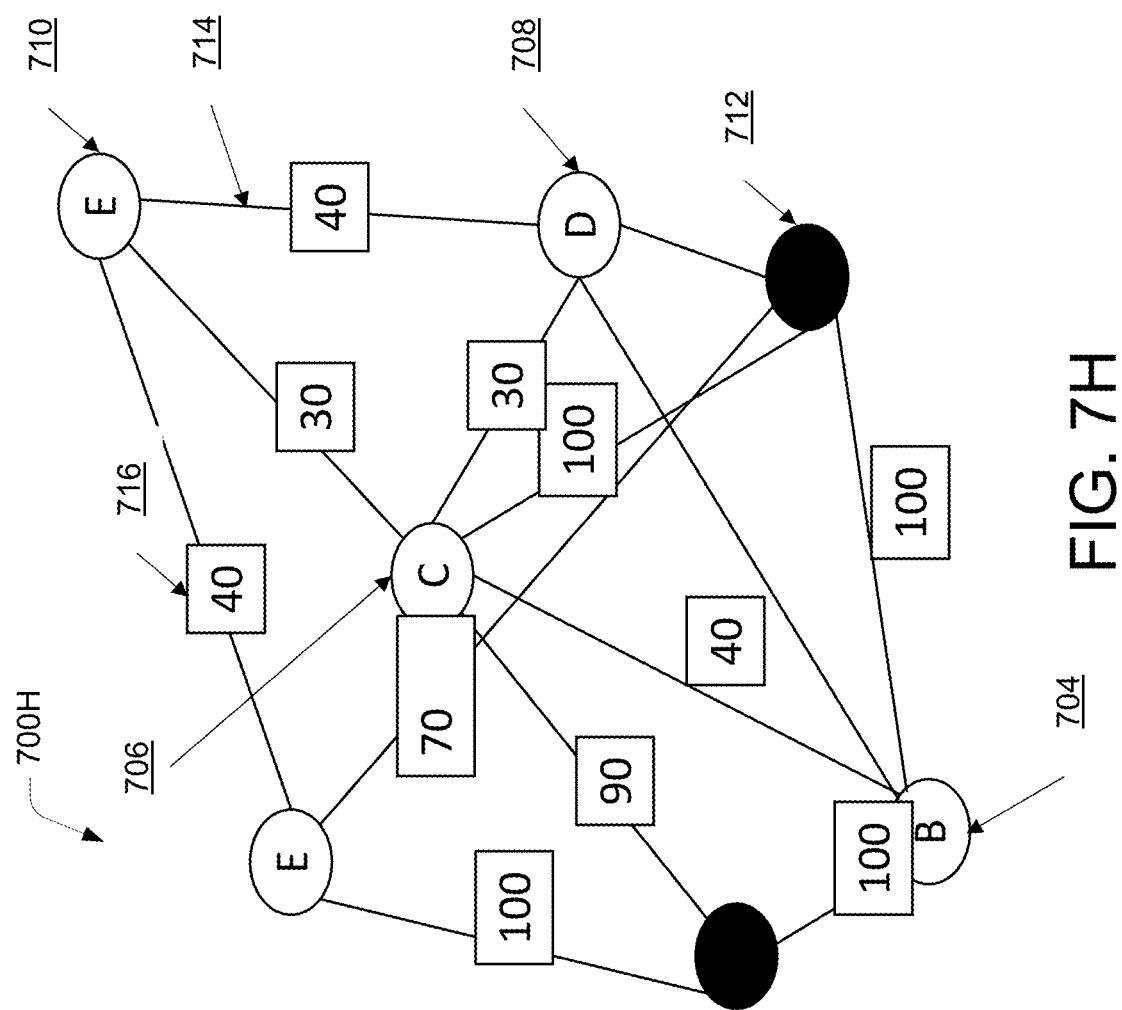

NETWORK OPTIMIZATION

BACKGROUND

The importance of network planning and optimization has been increasing with the advent of new telecommunication technology. This may include choosing sites for installing new telecommunication equipment such as, for example, base stations and or new telecommunication networks altogether. The task of planning future telecommunications networks may encounter multiple challenges due to the high complexity of the networks to be managed. The networks may face a constant need to adjust their coverage based on the changing urban spread & population density. For example, upgrading an existing telecommunication network framework to a new 5G network for serving future requirements may require significant investments. Therefore, it is important that a site for future network growth be chosen with care.

Currently, network expansion may occur in an ad-hoc manner, thereby making the entire process of network expansion reactive in nature. Various machine learning techniques have been implemented to enable the network to be adaptive for current and future needs. The current implementation of such methods may consider the equal density of centralized data locations even in places of sparse population and sparse consumer density. However, the current methods for network optimization do not account for future population density and consumer density for a region before providing locations for network expansion. Various methods for network optimization deployed presently may therefore may be ineffective and incomplete.

There may be a requirement for a network optimization system for adaptively clustering consumers of a network by projected population growth and optimize population spread and consumer density. Additionally, there may be a requirement for using an analytics centric approach for rationalizing the cost associated with deriving an optimum network coverage for a geographical location.

Accordingly, a technical problem with the currently available network optimization system is that they may be inefficient, inaccurate, and/or not scalable. There is a need for a density-based network optimization system that may account for the various factors mentioned above, amongst others, to generate optimal network locations for a geographical area in an efficient, and cost-effective manner, while also taking into consideration current and future population trends.

BRIEF DESCRIPTION OF DRAWINGS

FIG. 6B illustrates a component of the process described by FIG. 6A for network user cluster prediction using the density-based network prediction and optimization system, according to an example embodiment of the present disclosure.

FIG. 6D illustrates a component of the process described by FIG. 6A for network user cluster prediction using the density-based network prediction and optimization system, according to an example embodiment of the present disclosure.

FIG. 7A illustrates a diagram for a node generation process for network user cluster prediction based on the density-based network prediction and optimization system, according to an example embodiment of the present disclosure.

FIG. 7B illustrates a diagram for a second node generation process for network user cluster prediction based on the density-based network prediction and optimization system, according to an example embodiment of the present disclosure.

FIG. 7C illustrates a diagram for a multiple node generation process for network user cluster prediction based on the density-based network prediction and optimization system, according to an example embodiment of the present disclosure.

FIG. 7E illustrates a diagram for a multiple node generation and placement process for network user cluster prediction based on the density-based network prediction and optimization system, according to an example embodiment of the present disclosure.

FIG. 7H illustrates a diagram for a node optimization process for network user cluster prediction based on the density-based network prediction and optimization system, according to an example embodiment of the present disclosure.

DETAILED DESCRIPTION

Figure 1:
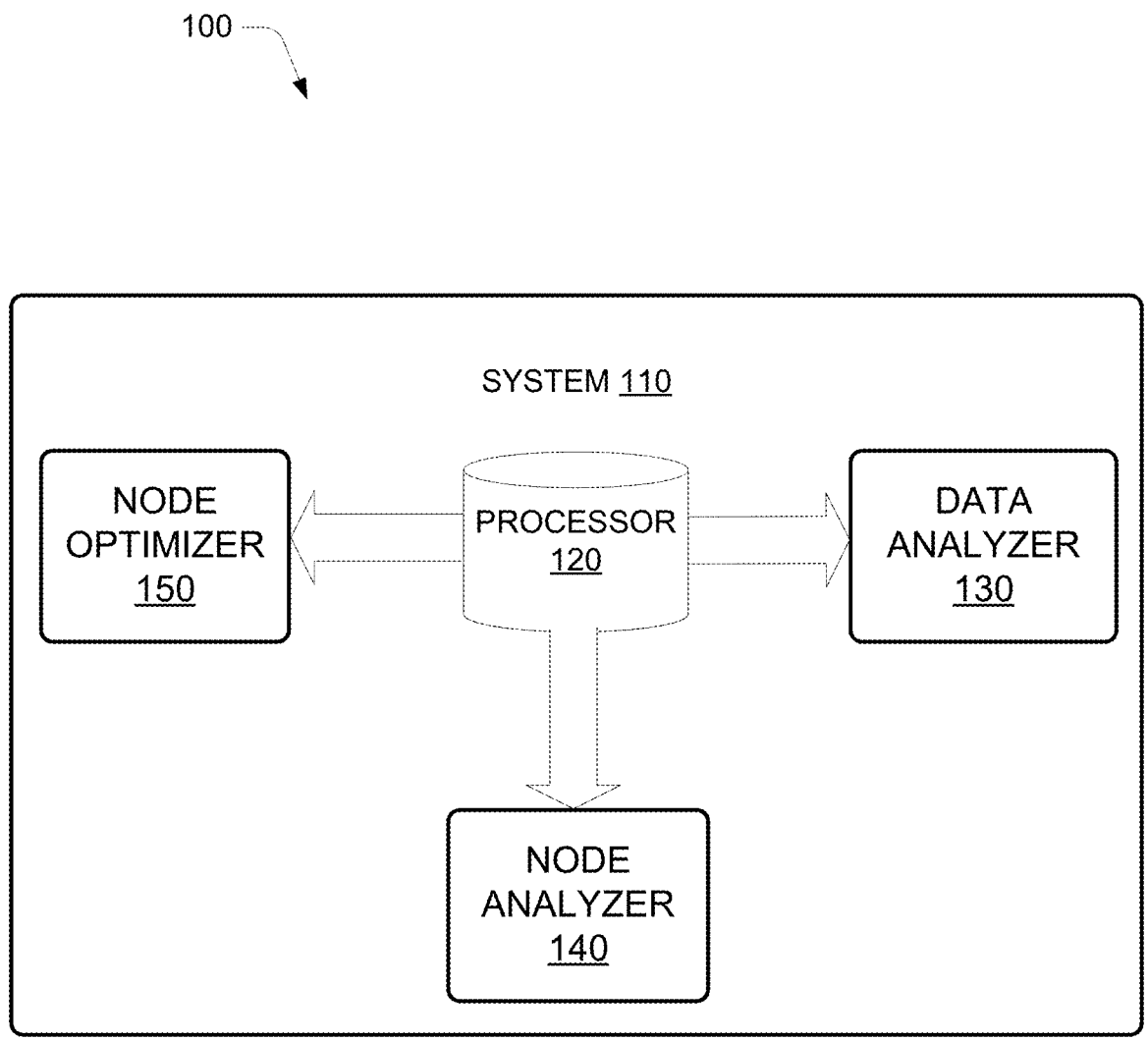
FIG. 1 illustrates a diagram for a density-based network prediction and optimization system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to.

The present disclosure describes a system and method for a density-based network prediction and optimization system (DBNPOS). The density-based network prediction and optimization system (referred to as "system" hereinafter) may be used to adaptively cluster consumers of a network and optimize consumer spread and density based on the projected growth of the consumers for a particular geographical area. In an example embodiment, the network may be a telecommunication network. Additionally, the networks may be a temporal utility, which may need to constantly adjust their coverage based on changing consumer spread and population density for a geographical sector. The system may be used for generating a holistic view of network growth across various geographical sectors and considering consumer density and other allied factors at the same time. Furthermore, the system may be used for upgrading present network sources based on future projections of consumer density. The system may also be used for prioritization and effective deployment of network building resources at the disposal of a user. Thus, the system may be used to enable a telecommunication network to be adaptive for current and future needs. In an example embodiment, the system may deploy various optimization algorithms to be more predictive and accurate regarding networks coverage area.

The system may facilitate algorithmic clustering of network consumers based on consumer spread and consumer density. For example, the system may receive an input in the form of a set geospatial locations for a particular network. The system may further receive corresponding consumer density data for each of the geospatial locations. The consumer density data may be an actual consumer density data or a predicted consumer density data. The system may endeavor to automatically define network tower placement locations from geospatial locations without a predetermined number of towers for the network. Specifically, the system may generate network clusters based on a maximum coverage a network unit may provide. To this end, the system may iteratively perform network clustering, which may maximize the distance between network units while reducing costs and maximizing network coverage.

The system may include a processor, a data analyzer, a node analyzer, and a node optimizer. The processor may be coupled to the data analyzer, the node analyzer, and the node optimizer. The data analyzer may receive a query from a user. The query may indicate a cluster prediction requirement. The data analyzer may determine a first node conglomerate by sorting a first dataset into a first plurality of nodes. In accordance with various embodiments of the present disclosure, each of the first plurality of nodes may be associated with the cluster prediction requirement.

The node analyzer may determine a plurality of attributes by sorting a second dataset associated with the cluster prediction requirement. The plurality of attributes may be associated with the cluster prediction requirement. The node analyzer may determine a second node conglomerate for each of the plurality of attributes. In accordance with various embodiments of the present disclosure, each of the second node conglomerate may include a second plurality of nodes associated with each of the plurality of attributes. The node analyzer may assign a node confidence score to each of the second plurality of nodes associated with each of the plurality of attributes. In an example, the node analyzer may modify the node confidence score assigned to each of the second plurality of nodes associated with each of the plurality of attributes based on input from the user. In an example, the node analyzer may predict at least one of the attributes from the plurality of attributes of the second dataset to generate a set of predicted plurality of attributes. The system may consider the set of predicted plurality of attributes as a unit of the plurality of attributes sorted from the second dataset.

The node optimizer may determine a node graph based on a comparison between the first node conglomerate and the second node conglomerate for each of the plurality of attributes. The node graph may include the first node conglomerate mapped to the second node conglomerate for each of the plurality of attributes through a plurality of mapped connections. The node optimizer may determine a map confidence index from the node graph. The map confidence index including a confidence value assigned to each of the plurality of mapped connections based on the node confidence score of the each of the second plurality of nodes associated with a corresponding mapped connection from each of the plurality of mapped connections. The node optimizer may modify the node graph iteratively based on a node optimization threshold value to generate a harmonized node graph. In an example, the node optimizer may generate the harmonized node graph by iteratively modifying the confidence value assigned to each of the plurality of mapped connections until the node optimization threshold value may be achieved. The processing of the cluster prediction requirement may be based on the harmonized node graph.

The embodiments for the cluster creation requirement presented herein are exemplary in nature and should be treated as such. For the sake of brevity and technical clarity, the description of the density-based network prediction and optimization system may be restricted to few exemplary embodiments, however, to a person skilled in the art it should be clear that the system may be used for the fulfillment of various network clustering and network prediction requirements other than those mentioned hereinafter.

Accordingly, the present disclosure aims to provide a density-based network prediction and optimization system which will consider all available options for network placement and expansion and provide the best option available. The present disclosure also provides for efficient and continuous analysis of data required for various network clustering processes, which in turn provides for continuous, efficient, and accurate analysis of the cluster creation requirements for providing optimal network coverage while incurring minimal costs. Furthermore, the present disclosure may categorically analyze various parameters that may have an impact on deciding a location for a telecommunication network placement and expansion. Specifically, the present disclosure may assign a weightage to each parameter corresponding with level of significance of that parameter for deciding the location for the telecommunication network placement and expansion.

FIG. 1 illustrates a system for density-based network prediction and optimization system 110 (referred to as system 110 hereinafter), according to an example implementation of the present disclosure. In an example, the system 110 may include a processor 120. The processor 120 may be coupled to a data analyzer 130, a node analyzer 140 and a node optimizer 150.

In accordance with an embodiment of the present disclosure, the data analyzer 130 may be configured to receive a query from a user. The query may indicate a cluster prediction requirement. In an example, the cluster prediction requirement may indicate a requirement, which may refer to a purpose of telecommunication network (referred to as "network" hereinafter) optimization. For example, the purpose may be to access locations, which may be suitable for network optimization. The purpose of the network optimization may be to understand and evaluate possible locations for network placement and network expansion in a particular demographic region or a geographical location. The purpose of the cluster prediction requirement may be planning for the placement of new network towers. The cluster prediction requirement may be the execution of plans made for network expansion by an organization. In an example, the cluster prediction requirement my be to adaptively cluster consumers of a network for the population by projected growth and optimize spread and consumer density for the network. The cluster prediction requirement may be to perform a region-wise analysis for a holistic view of growth across geography as well as the density of consumers for a network. The cluster prediction requirement may be to upgrade existing network units and/or add an increase number of network units based on the density of consumers for the network in a particular geographical location. The embodiments for the cluster prediction requirements presented herein are exemplary in nature and should be treated as such.

The data analyzer 130 may determine a first node conglomerate by sorting a first dataset into a first plurality of nodes. In accordance with various embodiments of the present disclosure, each of the first plurality of nodes may be associated with the cluster prediction requirement. The first dataset may include a set of geospatial locations with consumer density. The set of geospatial locations may include corresponding consumer density data for each of the locations. For example, the set of geospatial locations may include information about the latitude, and the longitude of the geospatial location. The data analyzer 130 may deploy various artificial intelligence techniques to sort the first dataset into the first plurality of nodes. The artificial intelligence techniques may be used for approximation and normalization of the set of geospatial locations and plotting the same based on a current consumer density for that particular geospatial location for generation of the first plurality of nodes (explained further by way of subsequent Figs.). The artificial intelligence techniques may include various clustering algorithms such as, for an example, a mean shift algorithm. In an example, each node from the first node conglomerate may be a centroid generated for each population cluster for a particular geospatial location. In an example, the data analyzer 130 may deploy the mean shift algorithm to sort the first dataset into the first plurality of nodes. In an example, the mean-shift may be a clustering algorithm that may generate data points for a dataset iteratively by shifting the data points towards the highest density data points. In an example, each of the nodes from the first plurality of nodes may be a centroid for a cluster of data points. The data points may be generated from the first dataset. The direction to the closest cluster centroid may be determined by the location of nearby data points. The algorithm shifts the nodes iteratively such that with each iteration, each of the data points may move closer to where the most points are at, which may lead to a cluster centroid. When the algorithm stops, each of the data points may be assigned to a cluster, and each of the clusters has been assigned a node from the first plurality of nodes. In an example, any algorithm which does not pre-define the number of clusters needed, and may only require a size of a spread around a cluster may be deployed by the system 110 to sort the first dataset into the first plurality of nodes.

The node analyzer 140 may determine a plurality of attributes by sorting a second dataset associated with the cluster prediction requirement. the second dataset may be associated with the first dataset and the cluster prediction requirement. For example, the second dataset may include consumer density data for the geo-spatial locations that may form the first dataset. The consumer density data may include a list of public places in that geospatial area, peak traffic hours for a particular public place in that geospatial area, existing network unit data for that geospatial area and the like. In an example, the existing network unit data may include the location of network cables, placement of cellular routers, and the like. The plurality of attributes may be associated with the cluster prediction requirement. In an example, the plurality of attributes may be identified through application of a set of category intelligence operations on the second dataset. The category intelligence operations may include identification of all measurable factors associated with the purpose of the cluster prediction requirement. In an example, the system 110 may identify a new set of attributes for processing each cluster prediction requirement. In an example, the set of attributes identified for a cluster prediction requirement may include at least one set that has been pre-set by a user. For example, the user may define a set of attributes to include parameters like a number of consumers for a network, location of network cables, location of various cellular routers, location of various public places in a particular geospatial location and the like. In an example, the system 110 may require permission from the user for updating the set of attributes based on new information available through the second dataset. In an example, the node analyzer 140 may predict at least one of the attributes from the plurality of attributes of the second dataset to generate a set of predicted plurality of attributes. The system 110 may consider the set of predicted plurality of attributes as a unit of the plurality of attributes sorted from the second dataset. In an example, the predicted plurality of attributes may include projected consumer density of over a period of time. For example, if one of the attributes from the plurality of attributes may be current consumer density, then the predicted plurality of attributes may include a first predicted attribute being a projected consumer density for the next 1 year, a second predicted attribute being a projected consumer density for the next 3 years, a third predicted attribute being a projected consumer density for the next 5 years and the like. In accordance with various embodiments of the present disclosure, the node analyzer 140 may deploy deep neural network times series algorithms for generating the predicted plurality of attributes. In an example, the deep neural network times series algorithms include a Multilayer Perceptrons (MLPs), Convolutional Neural Networks (CNNs), Long Short-Term Memory Networks (LSTMs), and hybrid algorithms from any of the above. The MLPs may be robust to noise, nonlinear, accept multivariate inputs and provide multi-step forecasts. The MLPs neural networks may be robust to noise in input data and in the mapping function and may support learning and prediction in the presence of missing values. The MLPs neural networks may not make strong assumptions about the mapping function and readily learn linear and nonlinear relationships. The MLPs neural networks enable an arbitrary number of input features to be specified for providing direct support for multivariate forecasting. The MLPs neural networks enable an arbitrary number of output values to be specified for providing direct support for multi-step and even multivariate forecasting. The CNNs may extract features from raw input data may be applied to time series forecasting problems. A sequence of observations may be treated like a one-dimensional image that a CNN model may process into the most salient elements. The recurrent neural networks like the LSTM may add the explicit handling of order between observations when learning a mapping function from inputs to outputs, not offered by MLPs or CNNs. They may support input data comprised of sequences of observations. In an example, any of hybrids of the MLPs, the CNNs and the LSTM models such as CNN-LSTMs, ConvLSTMs may be deployed to determine the predicted plurality of attributes. In an example, the Autoregressive forecasting methods such as AutoRegressive Integrated Moving Average (ARIMA) and Seasonal ARIMA (SARIMA) may be deployed to determine the predicted plurality of attributes. The ARIMA model may use a dependent relationship between an observation and some number of lagged observations. The model may integrate various observations to make the time series stationary, and the model may use the dependency between an observation and a residual error from a moving average model applied to lagged observations. The predicted plurality of attributes may be considered as a unit of the plurality of attributes.

The node analyzer 140 may determine a second node conglomerate for each of the plurality of attributes. The second node conglomerate may refer to every node conglomerate, which may be generated for each of the attributes from the plurality of attributes. For example, the node analyzer 140 may generate a set of node conglomerate depicting a number of consumers for a network in a region. The node analyzer 140 may generate a set of node conglomerate depicting a number of public places in a region. The node analyzer 140 may generate a set of node conglomerate depicting peak traffic hours for a particular public place in a region. In an example, a second node conglomerate may be generated for each of the predicted plurality of attributes. For example, the node analyzer 140 may generate a set of node conglomerate depicting the first predicted attribute, which may be the projected consumer density for next 1 year for every geospatial location from the first dataset. The node analyzer 140 may generate a set of node conglomerate depicting the second predicted attribute, which may be projected consumer density for the next 3 years for every geospatial location from the first dataset. The node analyzer 140 may generate a set of node conglomerate depicting the second predicted attribute, which may be projected consumer density for the next 5 years for every geospatial location from the first dataset. For sake of brevity and technical clarity the term "plurality of attributes" may be used hereinafter to describe the predicted plurality of attributes as well.

In accordance with various embodiments of the present disclosure, each of the second node conglomerate may include a second plurality of nodes associated with each of the plurality of attributes. The node analyzer 140 may generate the second plurality of nodes for the second node conglomerate using the mean shift algorithm mentioned above in the context of generating the first node conglomerate. The node analyzer 140 may deploy the first node conglomerate and the plurality of attributes for determining and placing each of the second node conglomerates. For example, the node analyzer 140 may determine the second plurality of nodes such that each node from each of the second plurality nodes may form a centroid for a particular data clusters but also remain in the vicinity of a node from the first plurality of nodes. As mentioned above that the first node conglomerate may be determined from the first dataset, which may comprise a set of geospatial locations, where a network unit may either be installed presently or where a network unit may be installed in future based on the current consumer density data or projected consumer density data. The second node conglomerate may be determined from the second data set, which may be associated with the first dataset. In an example, the node analyzer 140 may deploy the mean shift algorithm for placing the second node conglomerate in vicinity of the first node conglomerate such that the consumer density data may be correlated with the geospatial locations and the second plurality of nodes, which depict consumer density data may be placed as close as possible to the first plurality of nodes, which may depict the geospatial locations of networks.

The node analyzer 140 may assign a node confidence score to each of the second plurality of nodes associated with each of the plurality of attributes. In an example, there may be some nodes from each of the second plurality of nodes, which may have a higher prevalence over the cluster prediction requirement. Such nodes from the second plurality of nodes may be given a higher node confidence score. As mentioned above that the node analyzer 140 may generate a second node conglomerate for each of the predicted plurality of attributes. In such an example, there may be some nodes from each of the second plurality of nodes, which may correspond to such predicted attributes that may have a lower predictability confidence value. For example, the third predicted attribute, which may be projected consumer density for next 5 years maybe not as accurate as the first predicted attribute, which may be projected consumer density for next 1 year. Such nodes from the second plurality of nodes may be given a lower node confidence score. In an example, there may be nodes from the second plurality of nodes, which have a lower prevalence over the cluster prediction requirement. Such nodes from the second plurality of nodes may be given a lower node confidence score. The system 110 may be configured so that to give a higher priority to the nodes with a high confidence score and low priority to the nodes with a low confidence score while processing the cluster prediction requirement. The nodes representing the attributes from the plurality of attributes, which may be associated with a set of constraints associated with the cluster prediction requirement may be given a higher node confidence score than all other nodes. In an example, the set of constraints may include various locations where network cables have been placed or locations of various network distribution centres. Such attributes may not change easily and may be of paramount importance with respect to any decisions regarding network expansion. In an example, the second plurality of nodes associated with such constraint attributes from the plurality of attributes may be plotted after all other second node conglomerates have been represented.

In an example, the node analyzer 140 may modify the node confidence score assigned to each of the second plurality of nodes associated with each of the plurality of attributes based on input from the user. For example, nodes representing the locations of public places like restaurants may have been given a low confidence score due to uncertainty associated with the continuity of a restaurant, however, a user of the system 110 may decide that the locations of public places like restaurants should be given a higher confidence score for a particular geospatial location. The system 110 may modify the confidence score based on user input.

The node optimizer 150 may determine a node graph based on a comparison between the first node conglomerate and the second node conglomerate for each of the plurality of attributes. As mentioned above the node analyzer 140 may place each of the second node conglomerate as close as possible to the first node conglomerate so as to establish a relationship between the geospatial locations and associated consumer data. The second node conglomerate for each of the plurality of attributes may represent consumer density data, for example, current and projected consumer density for a number of years, location of public places, location of network cables and the like. The node optimizer 150 may deploy a distance metric function compare distance between various nodes. In an example, the node optimizer 150 may deploy a distance metric function compare distance between various nodes amongst the first plurality of nodes. In an example, the node optimizer 150 may deploy a distance metric function compare the distance between various nodes amongst each of the second plurality of nodes. In an example, the node optimizer 150 may deploy a distance metric function compare the distance between various nodes from the first node conglomerate with various nodes from each of the second node conglomerate. The nodes, which may be deemed as far based on the distance metric may not be considered for the comparison between the first node conglomerate and each of the second node conglomerate.

As mentioned above, the first node conglomerate may represent geospatial locations where network unit is either installed currently or might be installed in the future. The distance metric may calculate actual on-ground distance between various geospatial locations and scale down the same to interconnect the first plurality of nodes based on distance. As mentioned above, each of the second node conglomerate may represent an attribute from the plurality of attribute. The distance metric may be deployed by the node optimizer 150 to calculate actual on-ground distance between, for example, various locations where network cables have been placed and scale down the same to interconnect the second plurality of nodes representing various cable locations amongst themselves. In an example, the node optimizer 150 may calculate the actual on-ground distance between various locations where network cables have been placed and calculate actual on-ground distance between various geospatial locations for interconnecting the first plurality of nodes (geospatial network unit locations) with the second plurality of nodes representing various locations where network cables have been placed. In an example, the distance metric may be deployed by the node optimizer 150 to calculate actual on-ground distance between, for example, various nodes representing consumer clusters and scale down the same to interconnect the second plurality of nodes representing various consumer clusters amongst themselves. In an example, the node optimizer 150 may calculate the actual on-ground distance between various nodes representing consumer clusters and calculate actual on-ground distance between various geospatial locations for interconnecting the first plurality of nodes (geospatial network unit locations) with the second plurality of nodes representing various consumer clusters. In an example, the distance metric may be deployed by the node optimizer 150 to calculate actual on-ground distance between, for example, various public places and calculate actual on-ground distance between various geospatial locations for interconnecting the first plurality of nodes (geospatial network unit locations) with the second plurality of nodes representing various public places. The embodiments presented herein for comparison of the first node conglomerate and the second node conglomerate may be exemplary in nature and it should be understood that each of the plurality of attributes represented by each of the second node conglomerate may be linked to the first node conglomerate, which may represent the geospatial network unit locations.

The node graph may include the first node conglomerate mapped to the second node conglomerate for each of the plurality of attributes through a plurality of mapped connections. The plurality of mapped connections may refer to the interconnecting lines made upon the node graph. The plurality of mapped connections may include various interconnecting lines amongst various nodes from the first node conglomerate, and various nodes from the second node conglomerate. Each of the interconnecting lines from the plurality of mapped connections may be directly proportional to the distance between the nodes.

The node optimizer 150 may determine a map confidence index from the node graph. The map confidence index may include a confidence value assigned to each of the plurality of mapped connections based on the node confidence score of the each of the second plurality of nodes associated with a corresponding mapped connection from each of the plurality of mapped connections. The mapped connections from the plurality of mapped connections, which may connect two nodes both with a low node confidence score may be given a low confidence value. The mapped connections from the plurality of mapped connections, which may connect two nodes both with a high node confidence score may be given a high confidence value. The mapped connections from the plurality of mapped connections, which may connect two nodes where one of the nodes may have a low node confidence score and another of the nodes may have a high node confidence score may be evaluated and an average confidence value may be assigned to the corresponding mapped connection. The confidence value may act as a weightage indicator for the corresponding mapped connection. For example, a current consumer density may have a greater weightage as compared to a projected consumer density for the next five years, therefore, the confidence value given to the mapped connections associated with the nodes representing the current consumer density may be higher as compared to the confidence value given to the mapped connections associated with the nodes representing the projected consumer density for next five years. As mentioned above, each of the plurality of attributes is represented by a second node conglomerate. The node optimizer 150 might generate a low confidence value for all mapped connections associated with predicted attributes where a predictor difference between various predicted attributes may be weak thereby deeming them similarly relevant. In an example, the node optimizer 150 might generate a high confidence value for all mapped connections associated with constraint attributes (mentioned above). The map confidence index may be a congression of all the confidence values assigned to the plurality of mapped connections.

The node optimizer 150 may modify the node graph iteratively based on a node optimization threshold value to generate a harmonized node graph. The node graph generation as described above may include the first node conglomerate and each of the second node conglomerate for each of the plurality of attributes. As mentioned above some of the attributes may have a weak predictive difference may be considered similar in relevance. The node graph may include the second node conglomerate for such similar attributes as well. As mentioned above, the nodes representing the constraint attributes may have a higher node confidence score and maybe treated as having the highest relevance with respect to processing the cluster prediction requirement. The node optimizer 150 may deploy a Markov chain approach to reduce number of nodes from each of the second plurality of nodes, which may be representing attributes with similar relevance and connect all the resultant nodes from each of the second plurality of nodes representing each of the plurality of attributes with the nodes representing the constraint attributes. A Markov chain may be a stochastic model describing a probability for the chain of linked events in which the probability of each event depends only on the state attained in the previous event. The Markov chain may be deployed to maximize a joint possibility of a mapped connection associated with any of the constraint attributes (described above). The node optimizer 150 iteratively deploys the Markov chain approach to determine the nodes for which the confidence value of associated mapped connections may need to be modified. The nodes with low confidence values may be removed from the node graph. The nodes with higher confidence values may be shifted to be aligned as close as possible to the nodes representing the constraint attributes. The map confidence index of the node graph may be modified with each modification in the confidence value for any of plurality of mapped connections.

As mentioned above, the data analyzer 130 may determine the first node conglomerate, the node analyzer 140 may determine each of the second node conglomerate for each of the plurality of attributes, and the node optimizer 150 may determine a map confidence index based various confidence values assigned to the plurality of mapped connections. The node optimization threshold value may refer to a value of the map confidence index, which may demarcate a termination of the iterative process of modification of node graph by the node optimizer 150. The Markov chain approach may facilitate the determination of the node optimization threshold value. The harmonized node graph may refer to the node graph generated at the termination of the iterative process of modification of the node graph. The harmonized node graph is a steady-state for the node graph. In an example, the node optimizer 150 may generate the harmonized node graph by iteratively modifying the confidence value assigned to each of the plurality of mapped connections until the node optimization threshold value may be achieved. The processing of the cluster prediction requirement may be based on the harmonized node graph.

In accordance with various embodiments of the present disclosure, the system 110 may create a node graph library, by associating the plurality of attributes, the second plurality of nodes associated with each of the plurality of attributes, the harmonized node graph, and the map confidence index with the cluster prediction requirement. For example, the system may create a database wherein every cluster prediction requirement received by the system 110 may be linked to a corresponding plurality of attributes, the second plurality of nodes associated with each of the plurality of attributes, the harmonized node graph, and the map confidence index. The node graph library may be deployed by the system 110 for validation of the harmonized node graph for processing a cluster prediction requirement received for the same geospatial location at a future time.

Figure 2:
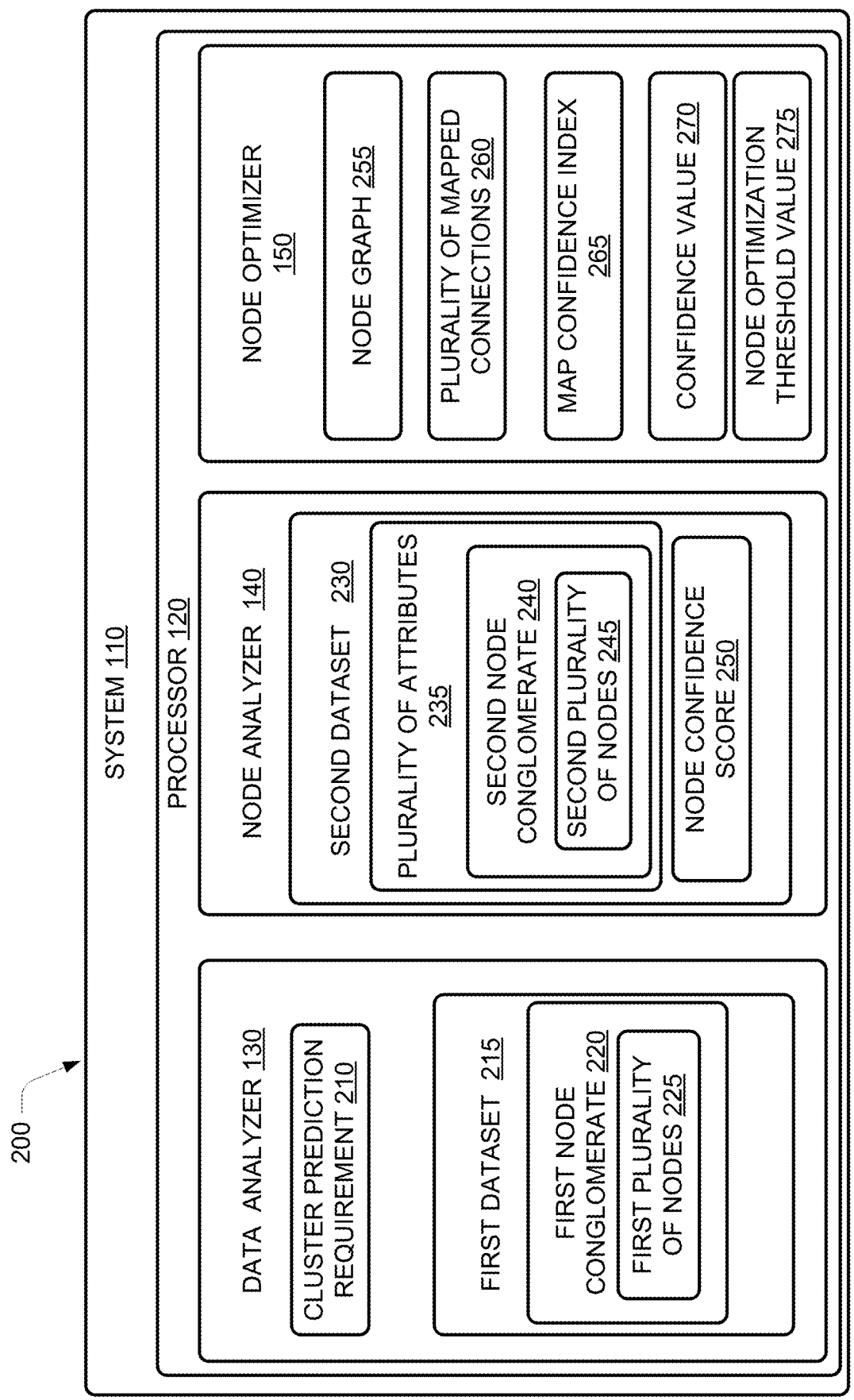
FIG. 2 illustrates various components of the density-based network prediction and optimization system, according to an example embodiment of the present disclosure.

FIG. 2 illustrates various components of the system 110 for a density-based network prediction and optimization system, according to an example embodiment of the present disclosure. In an example, the system 110 may include the processor 120. The processor 120 may be coupled to the data analyzer 130, the node analyzer 140 and the node optimizer 150.

In accordance with an embodiment of the present disclosure, the data analyzer 130 may be configured to receive a query from a user. The query may indicate a cluster prediction requirement 210. In an example, the cluster prediction requirement 210 may indicate a requirement, which may refer to a purpose of telecommunication network (referred to as "network" hereinafter) optimization. For example, the purpose may be to access locations, which may be suitable for network optimization. The purpose of the network optimization may be to understand and evaluate possible locations for network placement and network expansion in a particular demographic region or a geographical location. The purpose of the cluster prediction requirement 210 may be planning for the placement of new network towers. The cluster prediction requirement 210 may be the execution of plans made for network expansion by an organization. In an example, the cluster prediction requirement 210 may be to adaptively cluster consumers of a network for the population by projected growth and optimize spread and consumer density for the network. The cluster prediction requirement 210 may be to perform a region-wise analysis for a holistic view of growth across geography as well as the density of consumers for a network. The cluster prediction requirement 210 may be to upgrade existing network units and/or add an increase number of network units based on the density of consumers for the network in a particular geographical location. The embodiments for the cluster prediction requirement 210s presented herein are exemplary in nature and should be treated as such.

The data analyzer 130 may determine a first node conglomerate 220 by sorting a first dataset 215 into a first plurality of nodes 225. In accordance with various embodiments of the present disclosure, each of the first plurality of nodes 225 may be associated with the cluster prediction requirement 210. The first dataset 215 may include a set of geospatial locations with consumer density. The set of geospatial locations may include corresponding consumer density data for each of the locations. The data analyzer 130 may deploy various artificial intelligence techniques to sort the first dataset 215 into the first plurality of nodes 225. The artificial intelligence techniques may be used for approximation and normalization of the set of geospatial locations and plotting the same based on a current consumer density for that particular geospatial location for generation of the first plurality of nodes 225 (explained further by way of subsequent Figs.). The artificial intelligence techniques may include various clustering algorithms, for an example, a mean shift algorithm. In an example, each node from the first node conglomerate 220 may be a centroid generated for each population cluster for a particular geospatial location. In an example, the data analyzer 130 may deploy the mean shift algorithm to sort the first dataset 215 into the first plurality of nodes 225. In an example, the mean-shift may be a clustering algorithm that may generate data points for a dataset iteratively by shifting the data points towards the highest density data points. In an example, each of the nodes from the first plurality of nodes 225 may be a centroid for a cluster of data points. The data points may be generated from the first dataset 215. The direction to the closest cluster centroid may be determined by the location of nearby data points. The algorithm shifts the nodes iteratively such that with each iteration, each of the data points may move closer to where the most points are at, which may lead to a cluster centroid. When the algorithm stops, each of the data points may be assigned to a cluster, and each of the clusters has been assigned a node from the first plurality of nodes 225. In an example, any of the algorithms, which does not pre-define the number of clusters needed, and may only require a size of a spread around a cluster may be deployed by the system 110 to sort the first dataset 215 into the first plurality of nodes 225.

The node analyzer 140 may determine a plurality of attributes 235 by sorting a second dataset 230 associated with the cluster prediction requirement 210. the second dataset 230 may be associated with the first dataset 215 and the cluster prediction requirement 210. For example, the second dataset 230 may include consuming density data for the geospatial locations that may form the first dataset 215. The consumer density data may include a list of public places in that geospatial area, peak traffic hours for a particular public place in that geospatial area, existing network unit data for that geospatial area and the like. In an example, the existing network unit data may include the location of network cables, placement of cellular routers, and the like. The plurality of attributes 235 may be associated with the cluster prediction requirement 210. In an example, the plurality of attributes 235 may be identified through application of a set of category intelligence operations on the second dataset 230. The category intelligence operations may include identification of all measurable factors associated with the purpose of the cluster prediction requirement 210. In an example, the system 110 may identify a new set of attributes for processing each cluster prediction requirement 210. In an example, the set of attributes identified for a cluster prediction requirement 210 may include at least one set that has been pre-set by a user. For example, the user may define a set of attributes to include parameters like a number of consumers for a network, location of network cables, location of various cellular routers, location of various public places in a particular geospatial location and the like. In an example, the system 110 may require permission from the user for updating the set of attributes based on new information available through the second dataset 230. In an example, the node analyzer 140 may predict at least one of the attributes from the plurality of attributes 235 of the second dataset 230 to generate a set of predicted plurality of attributes 235. The system 110 may consider the set of predicted plurality of attributes 235 as a unit of the plurality of attributes 235 sorted from the second dataset 230. In an example, the predicted plurality of attributes 235 may include projected consumer density of over a period of time. For example, if one of the attributes from the plurality of attributes 235 may be current consumer density, then the predicted plurality of attributes 235 may include a first predicted attribute being a projected consumer density for the next 1 year, a second predicted attribute being a projected consumer density for the next 3 years, a third predicted attribute being a projected consumer density for the next 5 years and the like. In accordance with various embodiments of the present disclosure, the node analyzer 140 may deploy deep neural network times series algorithms for generating the predicted plurality of attributes 235. In an example, the deep neural network times series algorithms include a Multilayer Perceptrons (MLPs), Convolutional Neural Networks (CNNs), Long Short-Term Memory Networks (LSTMs), and hybrid algorithms from any of the above. The MLPs may be robust to noise, nonlinear, accept multivariate inputs and provide multi-step forecasts. The MLPs neural networks may be robust to noise in input data and in the mapping function and may support learning and prediction in the presence of missing values. The MLPs neural networks may not make strong assumptions about the mapping function and readily learn linear and nonlinear relationships. The MLPs neural networks enable an arbitrary number of input features to be specified for providing direct support for multivariate forecasting. The MLPs neural networks enable an arbitrary number of output values to be specified for providing direct support for multi-step and even multivariate forecasting. The CNNs may extract features from raw input data may be applied to time series forecasting problems. A sequence of observations may be treated like a one-dimensional image that a CNN model may process into the most salient elements. The recurrent neural networks like the LSTM may add the explicit handling of order between observations when learning a mapping function from inputs to outputs, not offered by MLPs or CNNs. They may support for input data comprised of sequences of observations. In an example, any of hybrids of the MLPs, the CNNs and the LSTM models such as CNN-LSTMs, ConvLSTMs may be deployed to determine the predicted plurality of attributes 235. In an example, the Autoregressive forecasting methods such as AutoRegressive Integrated Moving Average (ARIMA) and Seasonal ARIMA (SARIMA) may be deployed for determine the predicted plurality of attributes 235. The ARIMA model may use a dependent relationship between an observation and some number of lagged observations. The model may integrate various observations to make the time series stationary, and the model may use the dependency between an observation and a residual error from a moving average model applied to lagged observations. The predicted plurality of attributes 235 may be considered as a unit of the plurality of attributes 235. In an example, the node analyzer 140 may deploy a monto-carlo simulation for determining values for the predicted plurality of attributes 235 (explained in detail by way of FIG. 4).

The node analyzer 140 may determine a second node conglomerate 240 for each of the plurality of attributes 235. The second node conglomerate 240 may refer to every node conglomerate, which may be generated for each of the attributes from the plurality of attributes 235. For example, the node analyzer 140 may generate a set of node conglomerate depicting a number of consumers for a network in a region. The node analyzer 140 may generate a set of node conglomerate depicting a number of public places in a region. The node analyzer 140 may generate a set of node conglomerate depicting peak traffic hours for a particular public place in a region. In an example, a second node conglomerate 240 may be generated for each of the predicted plurality of attributes 235. For example, the node analyzer 140 may generate a set of node conglomerate depicting the first predicted attribute, which may be the projected consumer density for next 1 year for every geospatial location from the first dataset 215. The node analyzer 140 may generate a set of node conglomerate depicting the second predicted attribute, which may be projected consumer density for the next 3 years for every geospatial location from the first dataset 215. The node analyzer 140 may generate a set of node conglomerate depicting the second predicted attribute, which may be projected consumer density for the next 5 years for every geospatial location from the first dataset 215. For sake of brevity and technical clarity, the term "plurality of attributes 235" may be used hereinafter to describe the predicted plurality of attributes 235 as well.

In accordance with various embodiments of the present disclosure, each of the second node conglomerate 240 may include a second plurality of nodes 245 associated with each of the plurality of attributes 235. The node analyzer 140 may generate the second plurality of nodes 245 for the second node conglomerate 240 using the mean shift algorithm mentioned above in the context of generating the first node conglomerate 220. The node analyzer 140 may deploy the first node conglomerate 220 and the plurality of attributes 235 for determining and placing each of the second node conglomerate 240s. For example, the node analyzer 140 may determine the second plurality of nodes 245 such that each node from each of the second plurality nodes may form a centroid for a particular data clusters but also remain in the vicinity of a node from the first plurality of nodes 225. As mentioned above, the first node conglomerate 220 may be determined from the first dataset 215, which may comprise current consumer density data and a set of geospatial locations, which may have a network unit either installed presently or where a network unit may be installed in future. The second node conglomerate 240 may be determined from the second data set, which may be associated with the first dataset 215. In an example, the node analyzer 140 may deploy the mean shift algorithm for placing the second node conglomerate 240 in vicinity of the first node conglomerate 220 such that the consumer density data may be correlated with the geospatial locations and the second plurality of nodes 245, which depict consumer density data may be placed as close as possible to the first plurality of nodes 225, which may depict the geospatial locations of networks.

The node analyzer 140 may assign a node confidence score 250 to each of the second plurality of nodes 245 associated with each of the plurality of attributes 235. In an example, there may be some nodes from each of the second plurality of nodes 245, which may have a higher prevalence over the cluster prediction requirement 210. Such nodes from the second plurality of nodes 245 may be given a higher node confidence score 250. As mentioned above that the node analyzer 140 may generate a second node conglomerate 240 for each of the predicted plurality of attributes 235. In such an example, there may be some nodes from each of the second plurality of nodes 245, which may correspond to such predicted attributes that may have a lower predictability confidence value. For example, the third predicted attribute, which may be projected consumer density for next 5 years may be not as accurate as the first predicted attribute, which may be projected consumer density for next 1 year. Such nodes from the second plurality of nodes 245 may be given a lower node confidence score 250. In an example, there may be nodes from the second plurality of nodes 245, which have a lower prevalence over the cluster prediction requirement 210. Such nodes from the second plurality of nodes 245 may be given a lower node confidence score 250. The system 110 may be configured so that to give a higher priority to the nodes with a high confidence score and low priority to the nodes with a low confidence score while processing the cluster prediction requirement 210. The nodes representing the attributes from the plurality of attributes 235, which may be associated with a set of constraints associated with the cluster prediction requirement 210 may be given a higher node confidence score 250 than all other nodes. In an example, the set of constraints may include various locations where network cables have been placed or locations of various network distribution centers. Such attributes may not change easily and may be of paramount importance with respect to any decisions regarding network expansion. In an example, the second plurality of nodes 245 associated with such constraint attributes from the plurality of attributes 235 may be plotted after all other second node conglomerate 240s have been represented.

In an example, the node analyzer 140 may modify the node confidence score 250 assigned to each of the second plurality of nodes 245 associated with each of the plurality of attributes 235 based on input from the user. For example, nodes representing the locations of public places like restaurants may have been given a low confidence score due to uncertainty associated with the continuity of a restaurant, however, a user of the system 110 may decide that the locations of public places like restaurants should be given a higher confidence score for a particular geospatial location. The system 110 may modify the confidence score based on user input.

The node optimizer 150 may determine a node graph 255 based on a comparison between the first node conglomerate 220 and the second node conglomerate 240 for each of the plurality of attributes 235. As mentioned above the node analyzer 140 may place each of the second node conglomerate 240 as close as possible to the first node conglomerate 220 so as to establish a relationship between the geospatial locations and associated consumer data. The second node conglomerate 240 for each of the plurality of attributes 235 may represent consumer density data, for example, current and projected consumer density for a number of years, location of public places, location of network cables and the like. The node optimizer 150 may deploy a distance metric function compare distance between various nodes. In an example, the node optimizer 150 may deploy a distance metric function compare the distance between various nodes amongst the first plurality of nodes 225. In an example, the node optimizer 150 may deploy a distance metric function compare the distance between various nodes amongst each of the second plurality of nodes 245. In an example, the node optimizer 150 may deploy a distance metric function compare the distance between various nodes from the first node conglomerate 220 with various nodes from each of the second node conglomerate 240. The nodes, which may be deemed as far based on the distance metric may not be considered for the comparison between the first node conglomerate 220 and each of the second node conglomerate 240.

As mentioned above, the first node conglomerate 220 may represent geospatial locations where network unit is either installed currently or might be installed in the future. The distance metric may calculate actual on-ground distance between various geospatial locations and scale down the same to interconnect the first plurality of nodes 225 based on distance. As mentioned above, each of the second node conglomerate 240 may represent an attribute from the plurality of attributes 235. The distance metric may be deployed by the node optimizer 150 to calculate actual on-ground distance between, for example, various locations where network cables have been placed and scale down the same to interconnect the second plurality of nodes 245 representing various cable locations amongst themselves. In an example, the node optimizer 150 may calculate the actual on-ground distance between various locations where network cables have been placed and calculate actual on-ground distance between various geospatial locations for interconnecting the first plurality of nodes 225 (geospatial network unit locations) with the second plurality of nodes 245 representing various locations where network cables have been placed. In an example, the distance metric be deployed by the node optimizer 150 to calculate actual on-ground distance between, for example, various nodes representing consumer clusters and scale down the same to interconnect the second plurality of nodes 245 representing various consumer clusters amongst themselves. In an example, the node optimizer 150 may calculate the actual on-ground distance between various nodes representing consumer clusters and calculate actual on-ground distance between various geospatial locations for interconnecting the first plurality of nodes 225 (geospatial network unit locations) with the second plurality of nodes 245 representing various consumer clusters. In an example, the distance metric may be deployed by the node optimizer 150 to calculate actual on-ground distance between, for example, various public places and calculate actual on-ground distance between various geospatial locations for interconnecting the first plurality of nodes 225 (geospatial network unit locations) with the second plurality of nodes 245 representing various public places. The embodiments presented herein for comparison of the first node conglomerate 220 and the second node conglomerate 240 may be exemplary in nature and it should be understood that each of the plurality of attributes 235 represented by each of the second node conglomerate 240 may be linked to the first node conglomerate 220, which may represent the geospatial network unit locations.

The node graph 255 may include the first node conglomerate 220 mapped to the second node conglomerate 240 for each of the plurality of attributes 235 through a plurality of mapped connections 260. The plurality of mapped connections 260 may refer to the interconnecting lines made upon the node graph 255. The plurality of mapped connections 260 may include various interconnecting lines amongst various nodes from the first node conglomerate 220, and various nodes from the second node conglomerate 240. Each of the interconnecting lines from the plurality of mapped connections 260 may be directly proportional to the distance between the nodes.

The node optimizer 150 may determine a map confidence index 265 from the node graph 255. The map confidence index 265 may include a confidence value 270 assigned to each of the plurality of mapped connections 260 based on the node confidence score 250 of the each of the second plurality of nodes 245 associated with a corresponding mapped connection from each of the plurality of mapped connections 260. The mapped connections from the plurality of mapped connections 260, which may connect two nodes both with a low node confidence score 250 may be given a low confidence value 270. The mapped connections from the plurality of mapped connections 260, which may connect two nodes both with a high node confidence score 250 may be given a high confidence value 270. The mapped connections from the plurality of mapped connections 260, which may connect two nodes where one of the nodes may have a low node confidence score 250 and another of the nodes may have a high node confidence score 250 may be evaluated and an average confidence value 270 may be assigned to the corresponding mapped connection. The confidence value 270 may act as a weightage indicator for the corresponding mapped connection. For example, a current consumer density may have a greater weightage as compared to a projected consumer density for the next five years, therefore, the confidence value 270 given to the mapped connections associated with the nodes representing the current consumer density may be higher as compared to the confidence value 270 given to the mapped connections associated with the nodes representing the projected consumer density for next five years. As mentioned above, each of the plurality of attributes 235 is represented by a second node conglomerate 240. The node optimizer 150 might generate a low confidence value 270 for all mapped connections associated with predicted attributes where a predictor difference between various predicted attributes may be weak thereby deeming them similarly relevant. In an example, the node optimizer 150 might generate a high confidence value 270 for all mapped connections associated with constraint attributes (mentioned above). The map confidence index 265 may be a congression of all the confidence value 270 assigned to the plurality of mapped connections 260.

The node optimizer 150 may modify the node graph 255 iteratively based on a node optimization threshold value 275 to generate a harmonized node graph 255. The generation of the node graph 255 as described above may include the first node conglomerate 220 and each of the second node conglomerate 240 for each of the plurality of attributes 235. As mentioned above some of the attributes may have a weak predictive difference may be considered similar in relevance. The node graph 255 may include the second node conglomerate 240 for such similar attributes as well. As mentioned above, the nodes representing the constraint attributes may have a higher node confidence score 250 and maybe treated as having the highest relevance with respect to processing the cluster prediction requirement 210. The node optimizer 150 may deploy a Markov chain approach to reduce number of nodes from each of the second plurality of nodes 245, which may be representing attributes with similar relevance and connect all the resultant nodes from each of the second plurality of nodes 245 representing each of the plurality of attributes 235 with the nodes representing the constraint attributes. A Markov chain may be a stochastic model describing a probability for the chain of linked events in which the probability of each event depends only on the state attained in the previous event. The Markov chain may be deployed to maximize a joint possibility of a mapped connection associated with any of the constraint attributes (described above). The node optimizer 150 iteratively deploys the Markov chain approach to determine the nodes for which the confidence value 270 of associated mapped connections may need to be modified. The nodes with low confidence value 270 may be removed from the node graph 255. The nodes with higher confidence value 270 may be shifted to be aligned as close as possible to the nodes representing the constraint attributes. The map confidence index 265 of the node graph 255 may be modified with each modification in the confidence value 270 for any of plurality of mapped connections 260.

As mentioned above, the data analyzer 130 may determine the first node conglomerate 220, the node analyzer 140 may determine each of the second node conglomerate 240 for each of the plurality of attributes 235, and the node optimizer 150 may determine a map confidence index 265 based various confidence value 270 assigned to the plurality of mapped connections 260. The node optimization threshold value 275 may refer to a value of the map confidence index 265, which may demarcate a termination of the iterative process of modification of node graph 255 by the node optimizer 150. The Markov chain approach may facilitate the determination of the node optimization threshold value 275. The harmonized node graph 255 may refer to the node graph 255 generated at the termination of the iterative process of modification of the node graph 255. The harmonized node graph 255 is a steady-state for the node graph 255. In an example, the node optimizer 150 may generate the harmonized node graph 255 by iteratively modifying the confidence value 270 assigned to each of the plurality of mapped connections 260 until the node optimization threshold value 275 may be achieved. The processing of the cluster prediction requirement 210 may be based on the harmonized node graph 255.

In accordance with various embodiments of the present disclosure, the system 110 may create a node graph library, by associating the plurality of attributes 235, the second plurality of nodes 245 associated with each of the plurality of attributes 235, the harmonized node graph 255, and the map confidence index 265 with the cluster prediction requirement 210. For example, the system may create a database wherein every cluster prediction requirement 210 received by the system 110 may be linked to a corresponding plurality of attributes 235, the second plurality of nodes 245 associated with each of the plurality of attributes 235, the harmonized node graph 255, and the map confidence index 265. The node graph library may be deployed by the system 110 for validation of the harmonized node graph 255 for processing a cluster prediction requirement 210 received for the same geospatial location at a future time.

In operations, the system 110 may be deployed as a tool for efficient and effective network planning. The system 110 may be used to generate geospatial locations points, which may be appropriate for network unit installation keeping in view current consumer density, projected consumer density and future network demand in a particular geospatial region. As mentioned, the system 110 may include the data analyzer 130, the node analyzer 140 and the node optimizer 150. The system 110 may receive a cluster prediction requirement 210. The cluster prediction requirement 210 may include a requirement for creating network locations for a geographical region based on current and future population density of the geographical region under consideration.

The data analyzer 130 may receive the first dataset 215 along with the cluster prediction requirement 210. The first dataset 215 may include information about coordinates for the geographical region under consideration. The first dataset 215 may also include network capacity for each of the coordinates in case a network unit may already be installed in the geographical region under consideration. The first data set may also include current consumer density data for the geographical region under consideration. The data analyzer 130 may deploy an algorithm, for example, a mean shift algorithm for segregating the first dataset 215 into various smaller clusters and generating a centroid for each of the clusters. Such a process may lead to the generation of the first node conglomerate 220 comprising the first plurality of nodes 225 wherein, each node may represent a centroid for a cluster representing current consumer density for that cluster. The first node conglomerate 220 may represent optimal network locations based on current consumer density of the geographical region under consideration. In an example, the data analyzer 130 may place the first node conglomerate 220 on a map of the geographical region under consideration.

The node analyzer 140 may identify the plurality of attributes 235 associated with the cluster prediction requirement 210. In an example, the plurality of attributes 235 may include constraint attributes like locations of distribution centers, location of network cables and the like. In an example, the plurality of attributes 235 may include additional attributes such as the location of various public places, peak traffic hours for various public places and the like. The node analyzer 140 may deploy the current consumer density data and generate a projected consumer density data for a particular number of years for generating the predicted plurality of attributes 235. For example, the projected consumer density data may be generated for the next 1 year, 3 years, and 5 years. All of the projected consumer density data may represent the predicted plurality of attributes 235. The node analyzer 140 may generate the second node conglomerate 240 comprising the second plurality of nodes 245 for representing each of the plurality of attributes 235. For example, each of the projected consumer density data generated for the next 1 year, 3 years, and 5 years may be represented by a corresponding second node conglomerate 240. The node analyzer 140 may place the second node conglomerate 240 comprising the second plurality of nodes 245 for representing each of the plurality of attributes 235 as close as possible to the first node conglomerate 220. The second node conglomerate 240 comprising the second plurality of nodes 245 may represent optimal network locations based on the corresponding attribute from the plurality of attributes 235. The node analyzer 140 may assign the node confidence score 250 to each of the first plurality of nodes 225 from first node conglomerate 220 and each of the second plurality of nodes 245 representing each of the plurality of attributes 235. In an example, a lower node confidence score 250 may be given to nodes representing various projected attributes as compared to the node confidence score 250 assigned to various nodes representing current attributes. The node analyzer 140 may assign a highest node score to various nodes representing the constraint attributes since such attributes may be deemed to have greater prevalence over on-ground network placement.

The node optimizer 150 may generate a node graph 255 based on the distance metrics applied to the first plurality of nodes 225 and each of the second plurality of nodes 245. The node graph 255 may include various connections referred to as the plurality of mapped connections 260 for illustrating the distance between various nodes on the node graph 255. Each of the plurality of mapped connections 260 may be assigned a confidence value 270. The confidence value 270 may refer to weightage assigned to a particular mapped connection based in the node confidence score 250$s$ of the associated nodes. For example, a mapped connection between a node representing a constraint attribute and a node representing a current population density might be highest. In an example, all mapped connections associated with nodes representing the constraint attributes may be given a higher confidence value 270. The node optimizer 150 may determine a map confidence index 265 by congression of various confidence values 270 for the plurality of mapped connections 260.

The node optimizer 150 may iteratively modify the node graph 255 by modifying the confidence value 270 for each of the plurality of mapped connections 260 for generating a node graph 255 with strongest mapped connections and removing the nodes associated with weaker mapped connections. The weaker mapped connections may represent the attributes, which may have a lower prevalence upon the cluster prediction requirement 210. The node optimizer 150 may iteratively modify the node graph 255 by deploying the Markov chain approach until the node optimization threshold value 275 may be achieved. The resultant node graph 255 may be referred to as the harmonized node graph 255. The harmonized node graph 255 may a steady-state for the node graph 255 comprising the strongest possible connecting between various nodes. The locations represented by the nodes present in the harmonized node graph 255 may be given prioritization while actual on-ground network installation.

The process of density-based network optimization presented herein may be used for generating network locations for efficient and cost-effective planning and execution of the telecommunication network expansion and upgradation.

Figure 3:
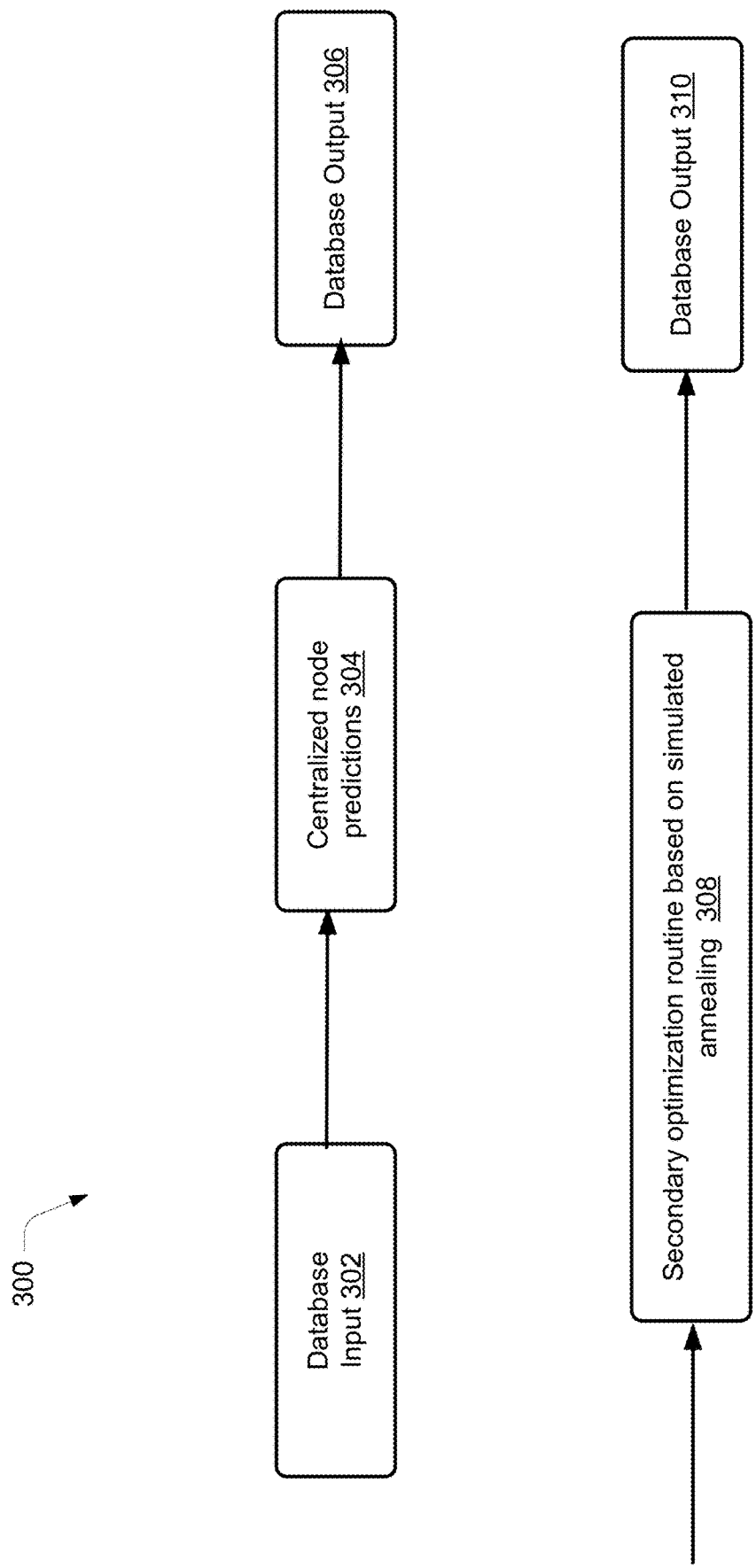
FIG. 3 illustrates a network flow diagram for network user cluster prediction using the density-based network prediction and optimization system, according to an example embodiment of the present disclosure.

FIG. 3 illustrates a network flow diagram 300 for network user cluster prediction using the system 110, according to an example embodiment of the present disclosure. Any of the components of the system 110 may be deployed to carry out the steps described by way of the network flow diagram 300.

The network flow diagram 300 (referred to as "process 300") may include a database input 302. The database input 302 may include the first dataset 215. In an example, the database input 302 may be input data with geospatial locations of current consumer density. The process 300 may include the deployment of an algorithm for centralized node prediction 304. The algorithm may be the mean shift algorithm described above. The centralized node prediction 304 may include determination of centroids for various data points from the first dataset 215 as described above. The centralized node prediction 304 may lead to a database output 306. In an example, the database output 306 may be the first node conglomerate 220 comprising the first plurality of nodes 225. The process 300 may further include the database output 306 to be used as an input for a second level optimization 308 (as described above by way of FIG. 2 and maybe explained in detail by subsequent Figs). The second level optimization 308 may include the system 110 to be implementing a secondary optimization routine based on simulated annealing. In an example, as mentioned above the second level optimization 308 may include determination of the plurality of attributes 235 from the second dataset 230. The plurality of attributes 235 may be used for determination of the second node conglomerate 240 (explained in detail by way of FIG. 1 and FIG. 2 and maybe explained further by way of subsequent figures). The second level optimization 308 second-level optimization 308 may include generation of the node graph 255. The second level optimization 308 may include iterative optimization of the node graph 255 for the generation of a database output 310. In an example, the database output 310 may include the harmonized node graph 255 (explained in detail by way of FIG. 1 and FIG. 2 and maybe explained further by way of subsequent figures).

Figure 4:
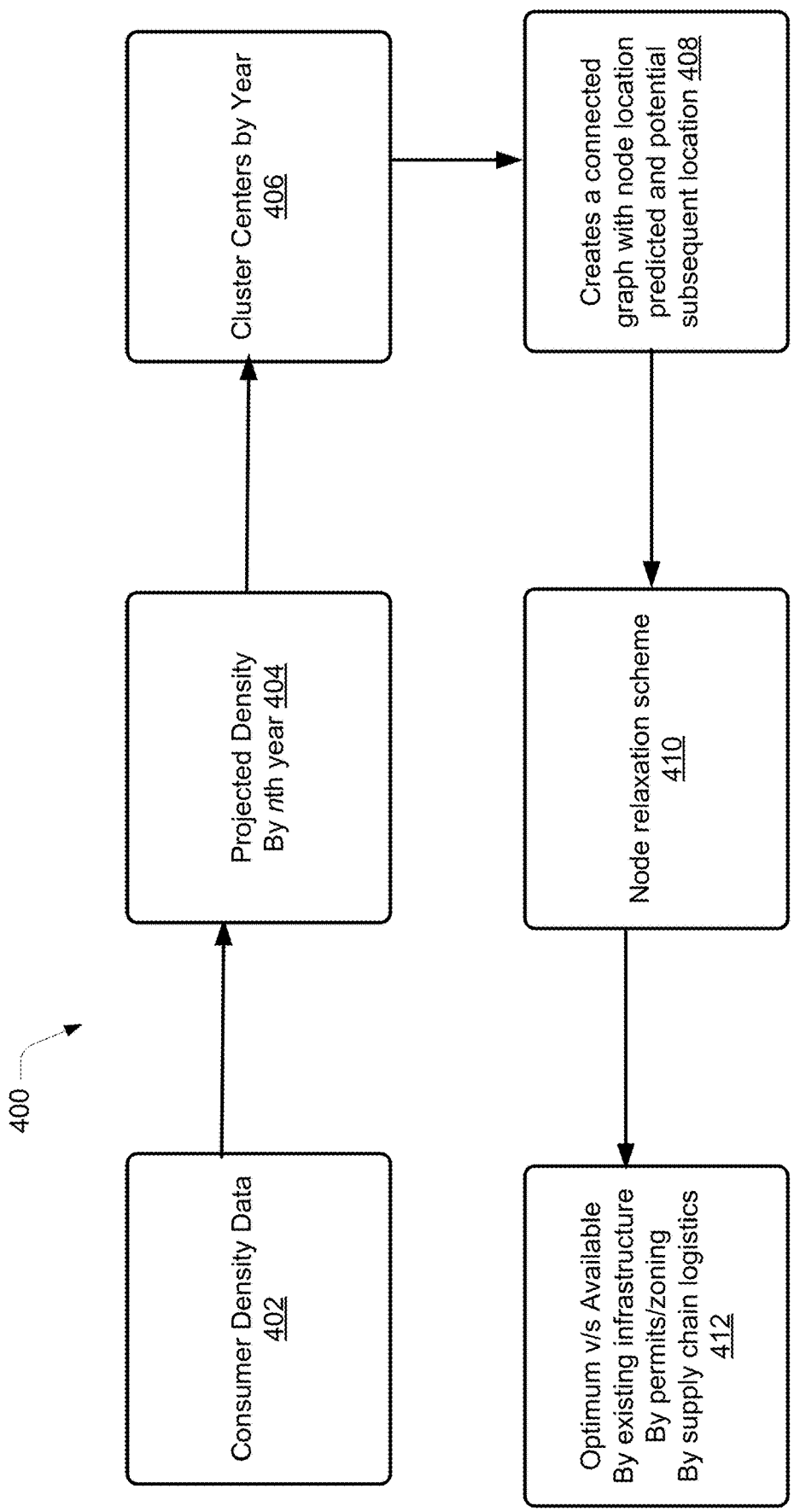
FIG. 4 illustrates a process for the deployment of a Monte-Carlo simulation for network user cluster prediction using the density-based network prediction and optimization system, according to an example embodiment of the present disclosure.

FIG. 4 illustrates a process 400 for the deployment of Monte-Carlo simulation for network user cluster prediction using the density-based network prediction and optimization system, according to an example embodiment of the present disclosure. Any of the components of the system 110 may be deployed to carry out the steps described by way of the process 400. In accordance to an exemplary embodiment of the present disclosure, the node analyzer 140 may predict at least one of the attributes from the plurality of attributes 235 of the second dataset 230 to generate the set of predicted plurality of attributes 235 by the way of process 400. The process 400 may deploy any of the algorithms mentioned by way of FIGS. 1 and 2 to generate the predicted plurality of attributes 235. In an example, the Monte-Carlo simulations may be used to generate the predicted plurality of attributes 235. The process 400 may describe the generation of projected consumer density data, however, to a person skilled in the art it should be clear that the process 400 may be used to generate the predicted plurality of attributes 235 and populate data for the same. The process 400 may include a consumer density data 402. The consumer density data 402 may be used to generate a projected density data 404. The projected density data 404 may include the first predicted attribute, which may include projected consumer density for next 1 year, the second predicted attribute, which may include projected consumer density for next 3 years, the third predicted attribute, which may include projected consumer density for next 5 years and the like. The process 400 may further include a segregation 406. The segregation 406 may generate clusters from the projected density data 404 and categorize the same as per year of relevance. As mentioned by way of FIG. 1 and FIG. 2 the segregation 406 may be accomplished through the application of various category intelligence operations of the projected density data 404. Also, as mentioned above the consumer density data 402 may be used to generate a projected density data 404 for a particular year and the step of segregation 406 may use the Monte-Carlo simulations to segregate the data for relevant years. The segregation 406 may be followed by a graph creation 408. The graph creation 408 may include the creation of a connected graph with locations may be predicted for each of the second plurality of nodes 245 representing each of the plurality of attributes 235. In an example, the graph creation 408 may use the Monte-Carlo simulations for node location prediction as described above. In an example, the graph creation 408 may include predicting a potential subsequent location for each of the second plurality of nodes 245 representing each of the plurality of attributes 235. The process 400 further includes a node relaxation scheme 410 (explained in detail by way of FIG. 5B). The node relaxation scheme 410 may include adjustment of locations of various nodes from each of the second plurality of nodes 245 representing each of the plurality of attributes 235 based on the node confidence score 250 and the map confidence index 265 (as described in detail by way of FIG. 2). The node relaxation scheme 410 may lead to an optimization 412. The optimization 412 may include connecting each of the remaining second plurality of nodes 245 representing each of the plurality of attributes 235 with the constraint attributes. In an example, the constraint attributes may include available infrastructure, supply chain logistics, current legal regulations, network permissions, network zones, location feasibility, and the like. For example, an optimization may be required if the most probable node locations are in the middle of a water body, or similar such unfeasible location. The optimization 412 may lead to the determination of geospatial location points for installing network units.

Figure 5A:
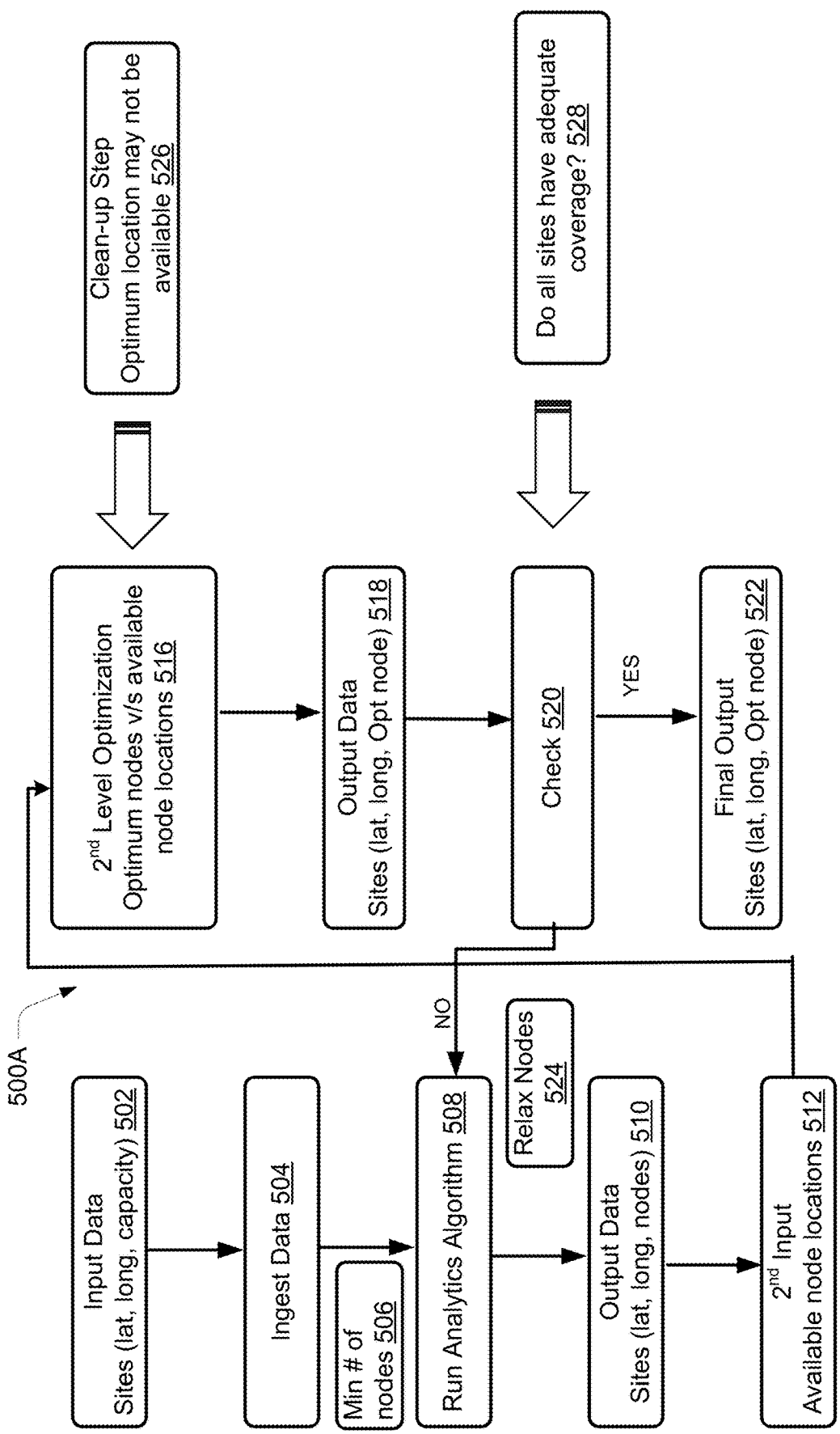
FIG. 5A illustrates a flow diagram for network user cluster prediction using the density-based network prediction and optimization system, according to an example embodiment of the present disclosure.

FIG. 5A illustrates a process 500A for network user cluster prediction using the density-based network prediction and optimization system, according to an example embodiment of the present disclosure. Any of the components of the system 110 may be deployed to carry out the steps described by way of the process 500A. The process 500A may include an input data 502. The input data 502 may include a set of geospatial locations, which may have an existing network unit installed or where a network unit may be considered for installation. In an example, the input data 502 may include information about a geographical latitude, the longitude of a location. In an example, the input data 502 may include the capacity of a network unit installed in that location. Such information may be useful for planning network upgradation. The process 500A may carry out an ingestion 504. The ingestion 504 may include processing of the input data 502 for determination of a minimum number of nodes 506. The ingestion 504 may be implemented assigning various data points to each of the minimum number of nodes 506. The minimum number of nodes 506 may be used as an input for an analysis 508. The analysis 508 may include running an analytical algorithm on the minimum number of nodes 506. In an example, the analytical algorithm may include application of the mean shift algorithm as mentioned above by way of FIG. 2. The analysis 508 may lead to an output data 510. The output data 510 may include the first node conglomerate 220 comprising the first plurality of nodes 225. The output 510 may be deployed as a unit for a second input 512. The second input 512 may include determination of the plurality of attributes 235 as described by way of FIG. 2 and generation of the second node conglomerate 240 comprising the second plurality of nodes 245 for representing each of the plurality of attributes 235. In an example, the second input 512 may include the second plurality of nodes 245 for representing each of the plurality of attributes 235 and the output 510. The second input 512 may be used for an optimization 516. The optimization 516 may determine a set of optimal node locations for network expansion. The optimization 516 may be accomplished by the system 110 through the generation of the node graph 255, determination of the map confidence index 265 and iterative modification of the node graph 255 until the node optimization threshold value 275 may be achieved as described in detail by way of FIG. 2. The optimization 516 may present a comparison between a set of optimal nodes determined through a second level optimization and available network locations. The process 500A may further include a check 526. The check 526 may determine if a location determined to an optimal location by the optimization 516 may be available for network installation. For example, as mentioned above, by way of FIG. 2, the node graph 255 and the map confidence index 265 may be required to consider the second plurality of nodes 245 representing the constraint attributes. As also mentioned by way of FIG. 4 the constraint attributes may include available infrastructure, supply chain logistics, current legal regulations, network permissions, network zones, location feasibility, and the like. For example, an optimization may be required if the most probable node locations are in the middle of a water body or similar such unfeasible location.

The optimization 516 may generate an output 518. The output 518 may include information related to the set of optimal nodes determined through a second level optimization. In an example, the information may include latitudes, longitudes for the optimal node locations as determined by the optimization 516. The process 500A may further include a check 520. The check 520 may determine if the number of each of the second plurality of nodes 245 for representing each of the plurality of attributes 235 may be sufficient or may need to be modified. As mentioned above by way of FIG. 2, the system 110 may iteratively modify the node graph 255 and the confidence value 270 for each of the plurality of mapped connections 260 associated with each of the second plurality of nodes 245 for representing each of the plurality of attributes 235 until the node optimization threshold value 275 may be achieved. In an example, the check 520 may determine if the node optimization threshold value 275 may have been achieved. In an example, the check 520 may determine that the node optimization threshold value 275 may not have been achieved. The process 500A may then execute a relax mode function 524 (explained in further detail by way of FIG. 500B). The relax node function 524 may lead to iteratively performing the analysis 508, generating the output 510, generating the second input 512, and performing the optimization 516, generating the output 518 until the check 520 may determine that the node optimization threshold value 275 may have been achieved. In an example, the check 520 may determine that the node optimization threshold value 275 may have been achieved, the process 500A may implement a check 528. The check 528 may determine if the resultant number of nodes may provide adequate coverage of network to the entire geospatial area, which may have been a part of the input 502. In an example, the check 520 may determine that the node optimization threshold value 275 may have been achieved and the check 528 may determine if the resultant number of nodes may provide adequate coverage of network to entire geospatial area, the process 500A may generate an output 522. The output 522 may include information related to the finalized set of optimal nodes determined through the optimization 516. In an example, the information may include latitudes, longitudes for the optimal node locations as determined by the optimization 516 and determined to be corroborating with the node optimization threshold value 275.

Figure 5B:
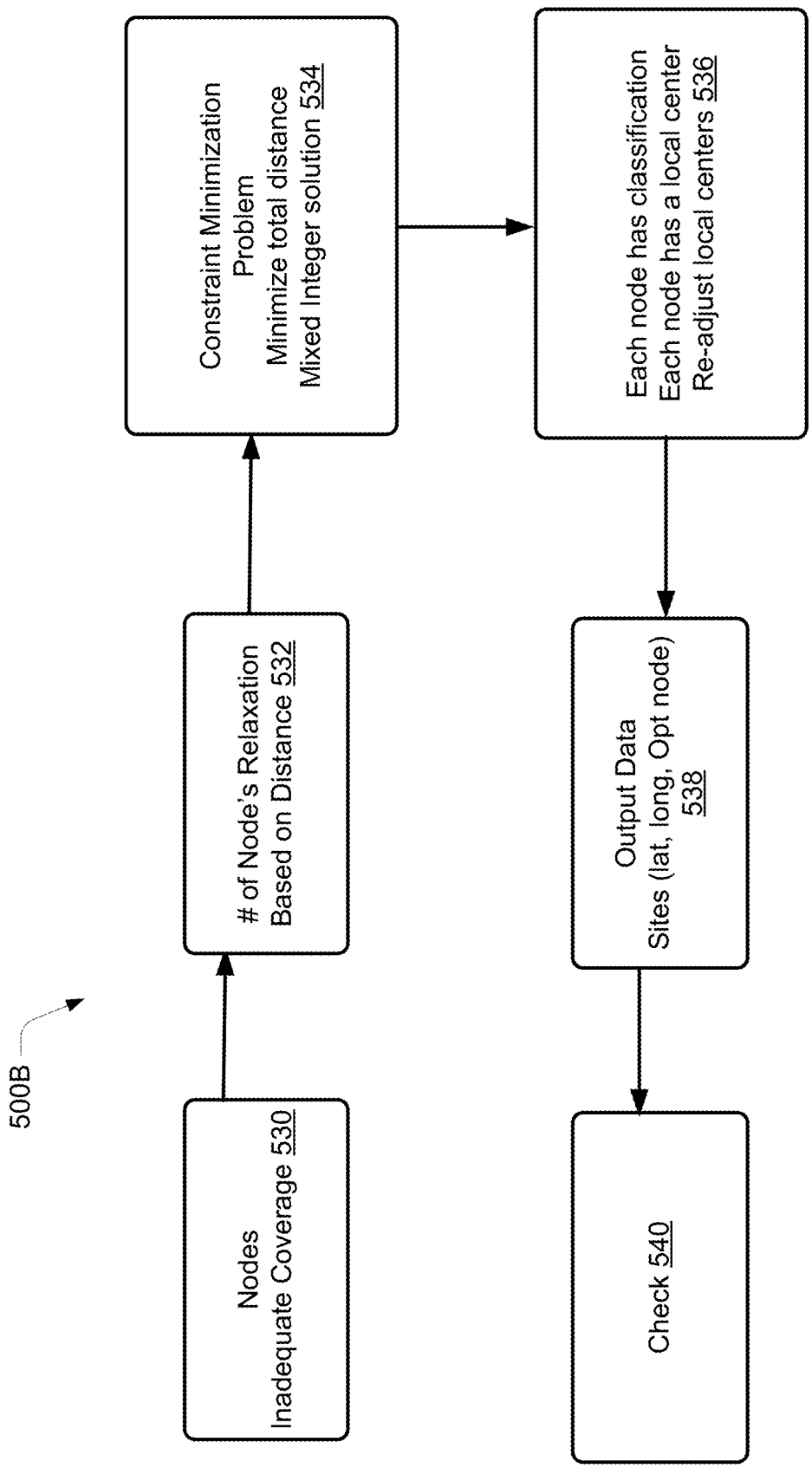
FIG. 5B illustrates a process of node relaxation for network user cluster prediction using the density-based network prediction and optimization system, according to an example embodiment of the present disclosure.

FIG. 5B illustrates a process of node relaxation for network user cluster prediction using the density-based network prediction and optimization system 110, according to an example embodiment of the present disclosure. Any of the components of the system 110 may be deployed to carry out the steps described by way of the process 500B. The process 500B may be implemented for executing the relax mode function 524. In an example, the check 520 may determine that the node optimization threshold value 275 may not have been achieved and the check 528 may determine that the resultant number of nodes may not provide adequate coverage of network to the entire geospatial area, the process 500B may be implemented by the system 110. The process 500B may include a detection 530. The detection 530 may be the result of the check 528 wherein it may have been determined that the resultant number of nodes may not provide adequate coverage of network to the entire geospatial area. The detection 530 may lead to an execution of a node relaxation 532. In an example, the node relaxation 532 may be determined through application of the distance metric as described in detail by way of FIG. 2. The node relaxation 532 may including removing the number of nodes which may be deemed to be far from any of the second plurality of nodes 245 representing the constraint attributes. The node relaxation 532 may lead to a reduced number of nodes for each of the plurality of attributes 235. The node relaxation 532 may lead to a constraint minimization 534 for further reduction in a minimum distance between various nodes from the first plurality of nodes 225 and the second plurality of nodes 245. In an example, a mixed-integer solution may be used for the constraint minimization 534. The process 500B may further include a readjustment 536. The readjustment 536 may include decentralization of various nodes for providing adequate coverage for the entire geospatial region under consideration. As mentioned by way of FIG. 1 and FIG. 2 the system 110 may implement the mean shift algorithm for find centers for all assigned datapoint. The readjustment 536 may include re-centering various nodes from the first node conglomerate 220 and the second node conglomerate 240 so to provide adequate coverage for providing adequate coverage for the entire geospatial region under consideration. The readjustment 536 may lead to an output data 538. The output data 538 may be similar to the output data 522. In an example, the output data 538 may include information related to the finalized set of optimal nodes determined through the optimization 516. In an example, the information may include latitudes, longitudes for the optimal node locations as determined by the optimization 516 and determined to be corroborating with the node optimization threshold value 275. The process 500B may implement a check 540 on the output data 538. The check 540 may determine if the resultant number of nodes may provide adequate coverage of network to the entire geospatial area.

Figure 6A:
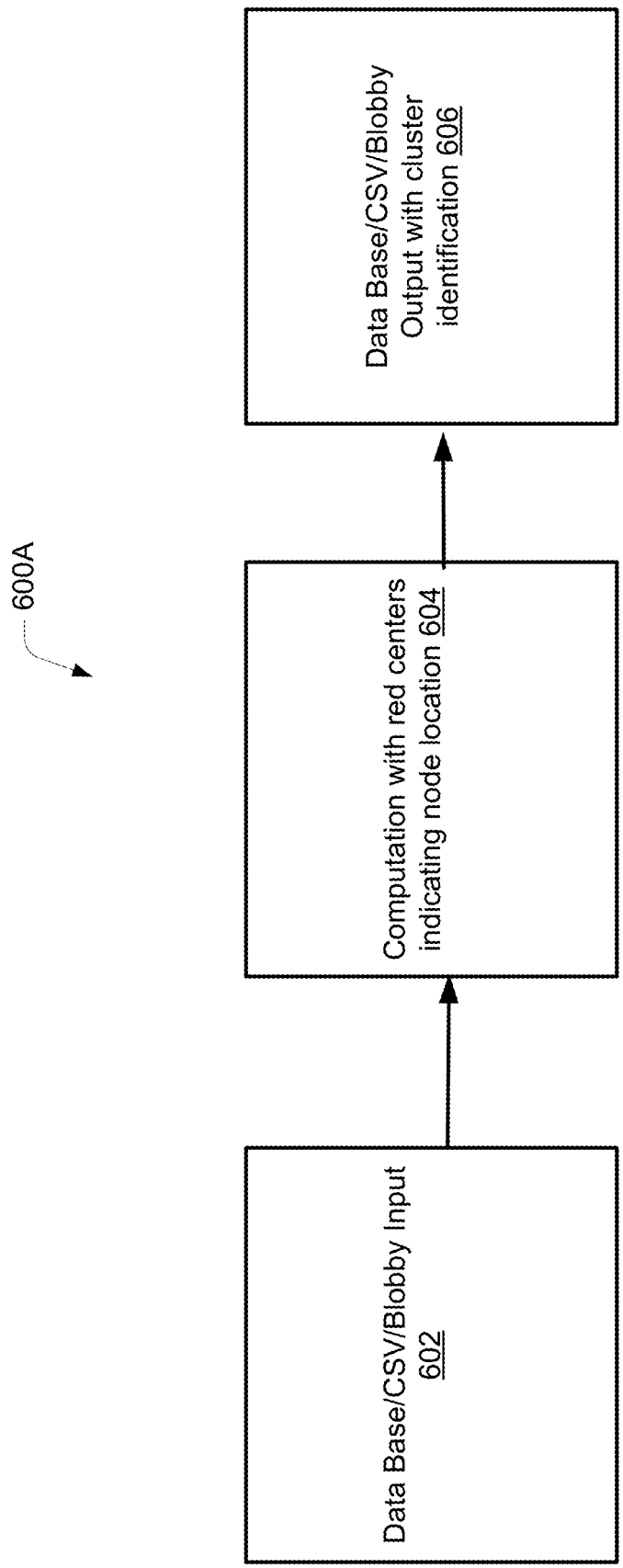
FIG. 6A illustrates a process for network user cluster prediction using the density-based network prediction and optimization system, according to an example embodiment of the present disclosure.

FIG. 6A illustrates a process 600A for network user cluster prediction using the density-based network prediction and optimization system 110, according to an example embodiment of the present disclosure. Any of the components of the system 110 may be deployed to carry out the steps described by way of the process 600A. The process 600A illustrates a use case process for the implementation of the system 110 for processing the cluster prediction requirement 210 for the purpose of network optimization. The process 600A may include an input 602, a computation 604, and an output 606. The input 602 may be described in detail by the way of FIG. 6B. The computation 604 may be described in detail by the way of FIG. 6C. The output 606 may be described in detail by way of FIG. 6D.

FIG. 6B illustrates a process step 600B from the process 600A described by FIG. 6A for network user cluster prediction using the density-based network prediction and optimization system 110, according to an example embodiment of the present disclosure. Any of the components of the system 110 may be deployed to carry out the steps described by way of the process step 600B. The process step 600B may illustrate the input 602. The input 602 may include geospatial data for a geospatial location. The geospatial location may be a location of relevance for the purpose of the processing the cluster prediction requirement 210. For example, a user may require to predict optimal network locations for providing optimal network coverage for the geospatial location keeping in view current and projected consumer density. In an example, the input 602 may be in the form of a database 614. The database 614 may be, for example, a Microsoft Excel® database. The database 614 may include information about latitudes, longitudes and network unit capacity for the geospatial location.

Figure 6C:
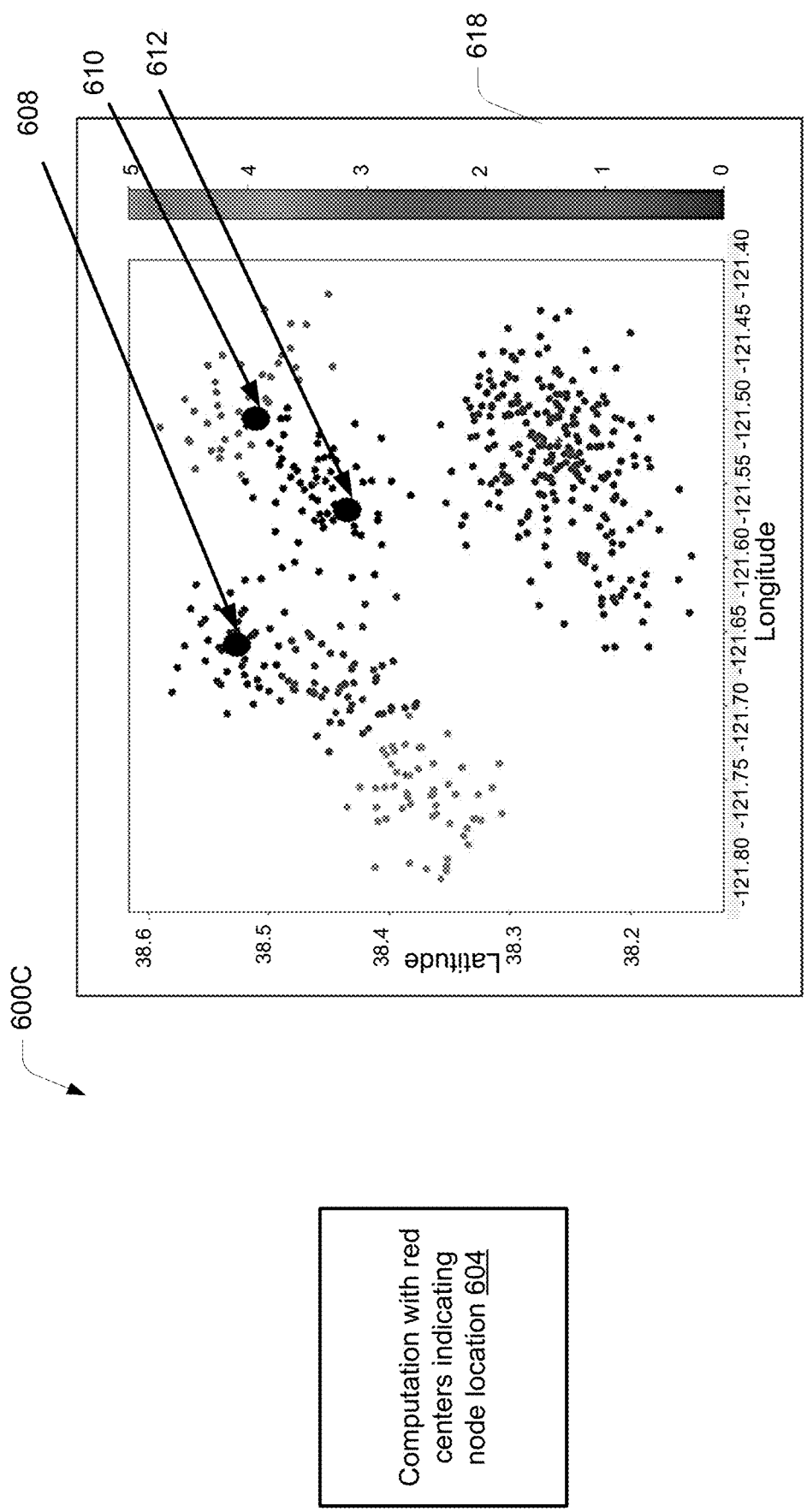
FIG. 6C illustrates a component of the process described by FIG. 6A for network user cluster prediction using the density-based network prediction and optimization system, according to an example embodiment of the present disclosure.

FIG. 6C illustrates a process step from the process 600A described by FIG. 6A for network user cluster prediction using the density-based network prediction and optimization system 110, according to an example embodiment of the present disclosure. Any of the components of the system 110 may be deployed to carry out the steps described by way of the process step 600C. The process step 600C may illustrate the computation 604. The computation 604 may implement any of the algorithms mentioned by way of FIG. 2 for generating a map 618. The map 618 may illustrate the first node conglomerate 220, and the second node conglomerate 240. The computation 604 may optimize the map 618 through the operational details described by way of FIG. 2 for determining a first node 608, a second node 610, and a third node 612. The first node 608, the second node 610, and the third node 612 may be the optimal locations for placement of network units in order to provide optimal coverage to the entire geospatial location in consideration.

Figure 6D:
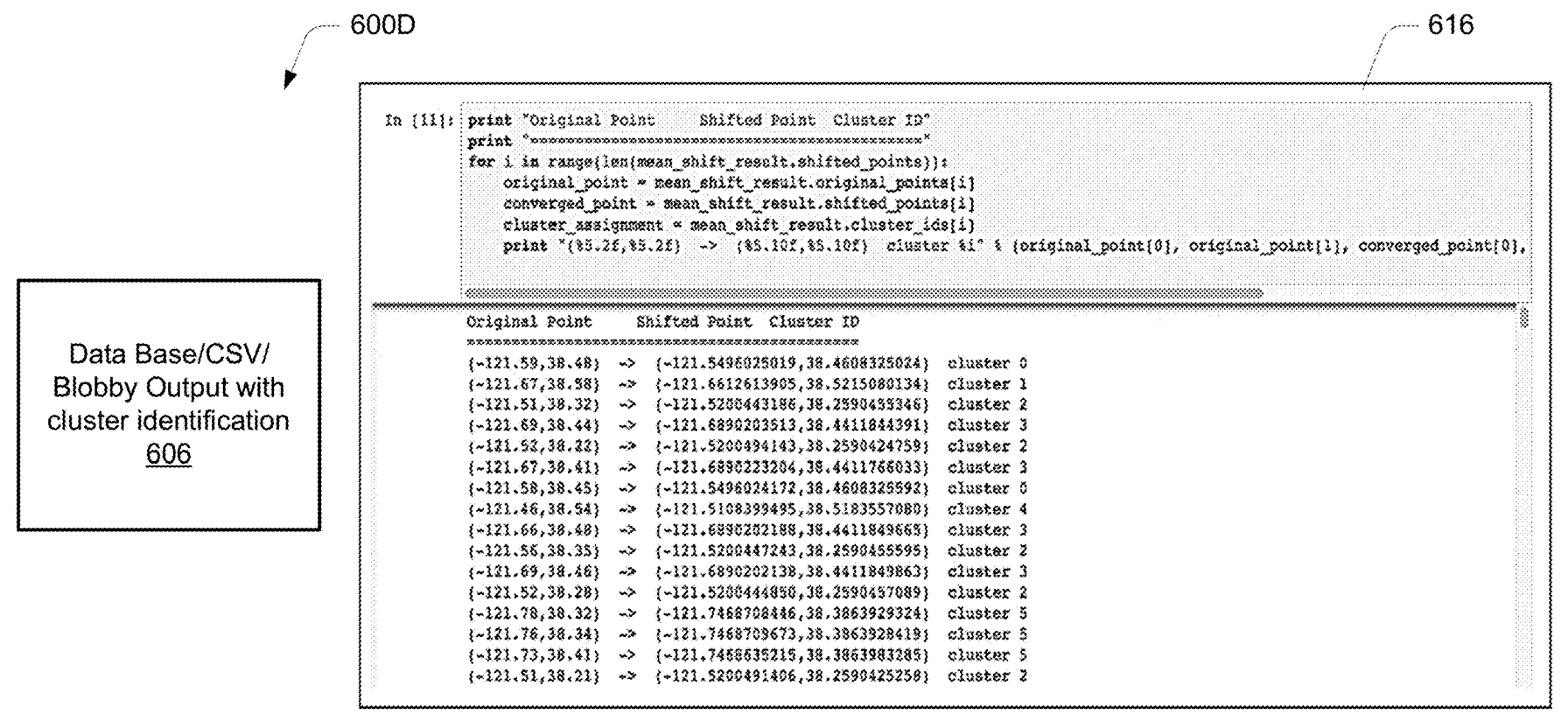

FIG. 6D illustrates a process step 600D from the process 600A described by FIG. 6A for network user cluster prediction using the density-based network prediction and optimization system 110, according to an example embodiment of the present disclosure. Any of the components of the system 110 may be deployed to carry out the steps described by way of the process step 600D. The process step 600D may illustrate the output 606. In an example, the output 606 may be in the form of a database 616. The database 616 may be, for example, a Microsoft Excel® database. The database 616 may include information about various clusters of consumer density identified after the implementation of the computation 604 on the input 602. The output 606 may be the harmonized node graph 255 generated to process the cluster prediction requirement 210. The output 606 may include various consumer clusters identified across the geospatial location for placement of the network units for providing optimal network coverage. As mentioned above, the system 110 may deploy a mean shift algorithm for clustering consumer density and optimizing the same by modifying the centres through the re-centring process 536, the output 606 may include coordinates for original clusters as predicted by the system 110 through generation of the node graph 255 and output 606 may also include a set of shifted point coordinates for all the original clusters. In an example, the set of shifted point coordinates may be generated through iteratively modifying the node graph 255 until the node optimization threshold value 275 may be achieved (as explained in detail by way of FIG. 2).

FIG. 7A illustrates a diagram for a node generation process 700A for network user cluster prediction based on the density-based network prediction and optimization system, according to an example embodiment of the present disclosure. Any of the components of the system 110 may be deployed to carry out the steps described by way of the process 700A. The process 700A may yield a node conglomerate 702. In an example, the node conglomerate 702 may be the first node conglomerate 220. As mentioned in detail by way of FIG. 2, the first dataset 215 including a set of geospatial location coordinates may be processed using any algorithm, for example, the mean shift algorithm for the generation of the first node conglomerate 220 comprising the first plurality of nodes 225. In the exemplary embodiment illustrated by the FIG. 700A, the node conglomerate 702 may be the first node conglomerate 220 comprising consumer density details for a geospatial location. As mentioned above, the consumer density details for a geospatial location may include information regarding latitudes, longitudes, and network capacity for the geospatial location under consideration. The node conglomerate 702 may comprise a plurality of nodes represented by letter "A" for illustrative purposes.

FIG. 7B illustrates a diagram for a second node generation process 700B for network user cluster prediction based on the density-based network prediction and optimization system, according to an example embodiment of the present disclosure. Any of the components of the system 110 may be deployed to carry out the steps described by way of the process 700B. As mentioned by way of FIG. 2, the consumer density data may be used by the system 110 to generate a projected consumer density data for a particular number of years. For example, the first predicted attribute may include projected consumer density data for the next 1 year, the second predicted attribute may include projected consumer density data for the next 3 years, and the third predicted attribute may include projected consumer density data for the next 5 years. In an example, any of these projected consumer density data may be plotted against the node conglomerate 702 in the form of a first projected attribute node conglomerate 704. In an example, the first projected attribute node conglomerate 704 may be the second node conglomerate 240 representing one of the predicted attributes from the plurality of attributes 235. As mentioned by way of FIG. 2, the system may deploy any of the deep neural networks time series for generating the predicted attributes from the plurality of attributes 235. The first projected attribute node conglomerate 704 may comprise a plurality of nodes represented by letter "B" for illustrative purposes.

FIG. 7C illustrates a diagram for a multiple node generation process 700C for network user cluster prediction based on the density-based network prediction and optimization system, according to an example embodiment of the present disclosure. Any of the components of the system 110 may be deployed to carry out the steps described by way of the process 700C. The process 700C may yield the plotting of all the projected attributes along with the node conglomerate 702 thereby generating a second projected attribute node conglomerate 706, and a third projected attribute node conglomerate 708. In the illustrated example the node conglomerate 702 may be an optimal location for placement of a network unit based on current consumer density. The first projected attribute node conglomerate 704 may be an optimal location for placement of a network unit based on the projected consumer density for the next 1 year. The second projected attribute node conglomerate 706 may be an optimal location for placement of a network unit based on the projected consumer density for the next 3 years. The third projected attribute node conglomerate 708 may be an optimal location for placement of a network unit based on the projected consumer density for the next 5 years. The first projected attribute node conglomerate 704, the second projected attribute node conglomerate 706, and the third projected attribute node conglomerate 708 may be exemplary in nature and should be treated as such. It must be clear to a person skilled in the art that any number of projected attribute node conglomerates may be plotted next to the node conglomerate 702 which may represent optimal network locations as per current consumer density. The second projected attribute node conglomerate 706 may comprise a plurality of nodes represented by letter "C" for illustrative purposes. The third projected attribute node conglomerate 708 may comprise a plurality of nodes represented by letter "D" for illustrative purposes.

Figure 7D:
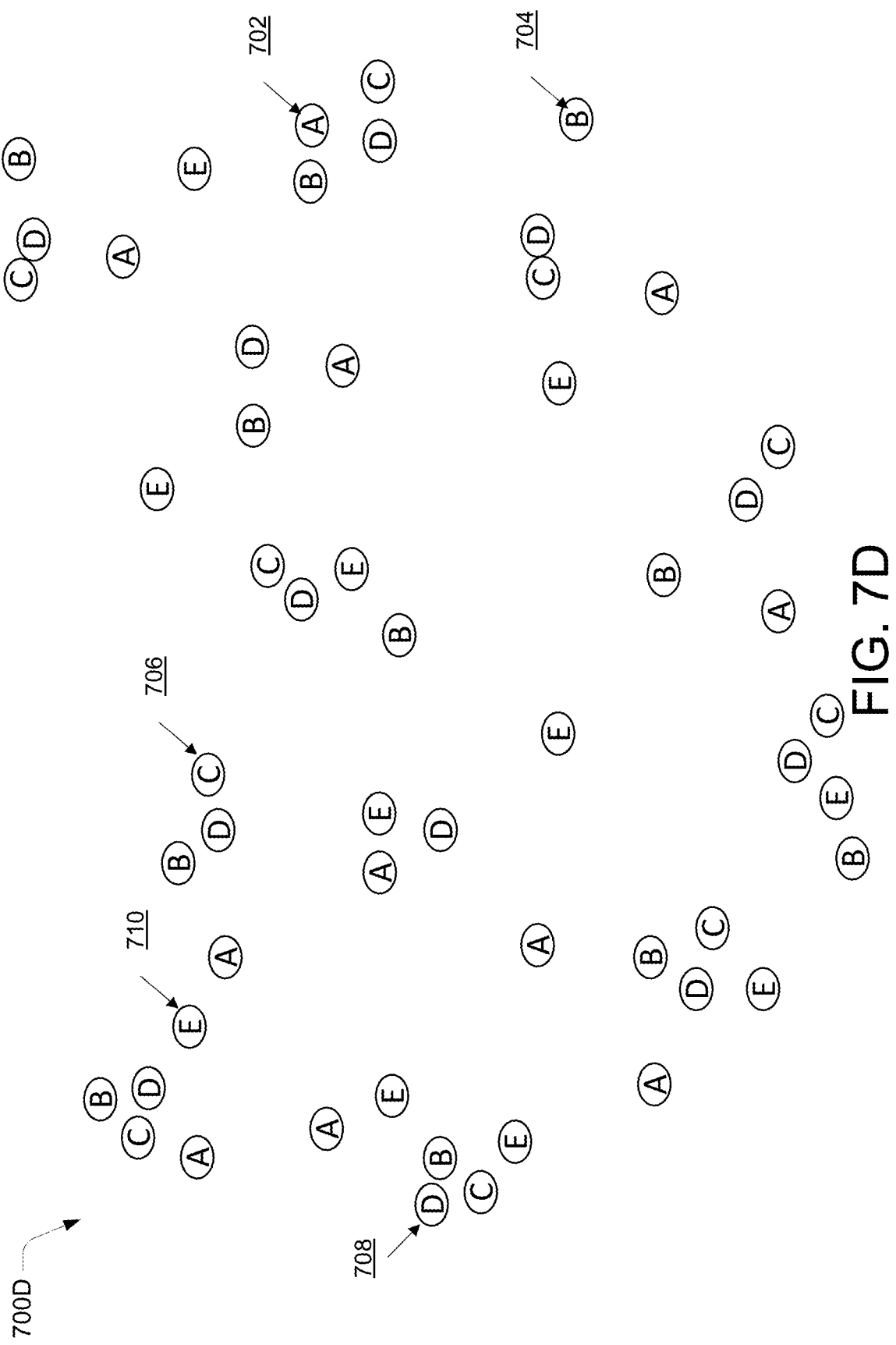
FIG. 7D illustrates a diagram for a multiple node generation process in accordance with various attributes of a cluster prediction requirement for network user cluster prediction based on the density-based network prediction and optimization system, according to an example embodiment of the present disclosure.

FIG. 7D illustrates a diagram for a multiple node generation process 700D in accordance with various attributes of a cluster prediction requirement 210 for network user cluster prediction based on the density-based network prediction and optimization system, according to an example embodiment of the present disclosure. Any of the components of the system 110 may be deployed to carry out the steps described by way of the process 700D. The process 700D may illustrate the generation of a constraint attribute node conglomerate 710. The constraint attribute node conglomerate 710 may comprise a plurality of nodes represented by letter "E" for illustrative purposes. The constraint attribute node conglomerate 710 may represent a constraint attribute, for example, a future user instantaneous bandwidth. The constraint attribute node conglomerate 710 representing the future user instantaneous bandwidth may include optimal network locations based on the future user instantaneous bandwidth. The process 700D may include placing a set of node conglomerates for each of the constraint attributes identified by the system 110 and the user of the system 110. In an example, the constraint attribute node conglomerate 710 may be the second node conglomerate 240 representing a constraint attribute from the plurality of attributes 235.

FIG. 7E illustrates a diagram for a multiple node generation and placement process 700E for network user cluster prediction based on the density-based network prediction and optimization system, according to an example embodiment of the present disclosure. Any of the components of the system 110 may be deployed to carry out the steps described by way of the process 700E. The process 700E includes placement of a local information node conglomerate 712 around the node conglomerate 702, the first projected attribute node conglomerate 704, the second projected attribute node conglomerate 706, the third projected attribute node conglomerate 708, and the constraint attribute node conglomerate 710. The local information node conglomerate 712 may comprise a plurality of nodes represented by a "black dot" for illustrative purposes. In an example, the local information node conglomerate 712 may be based on constraint attributes identified by the system 110 for a particular geospatial region. In an example, the constraint attributes may include locations of network cables, locations of existing network units, locations of nearest distribution centers and the like.

Figure 7F:
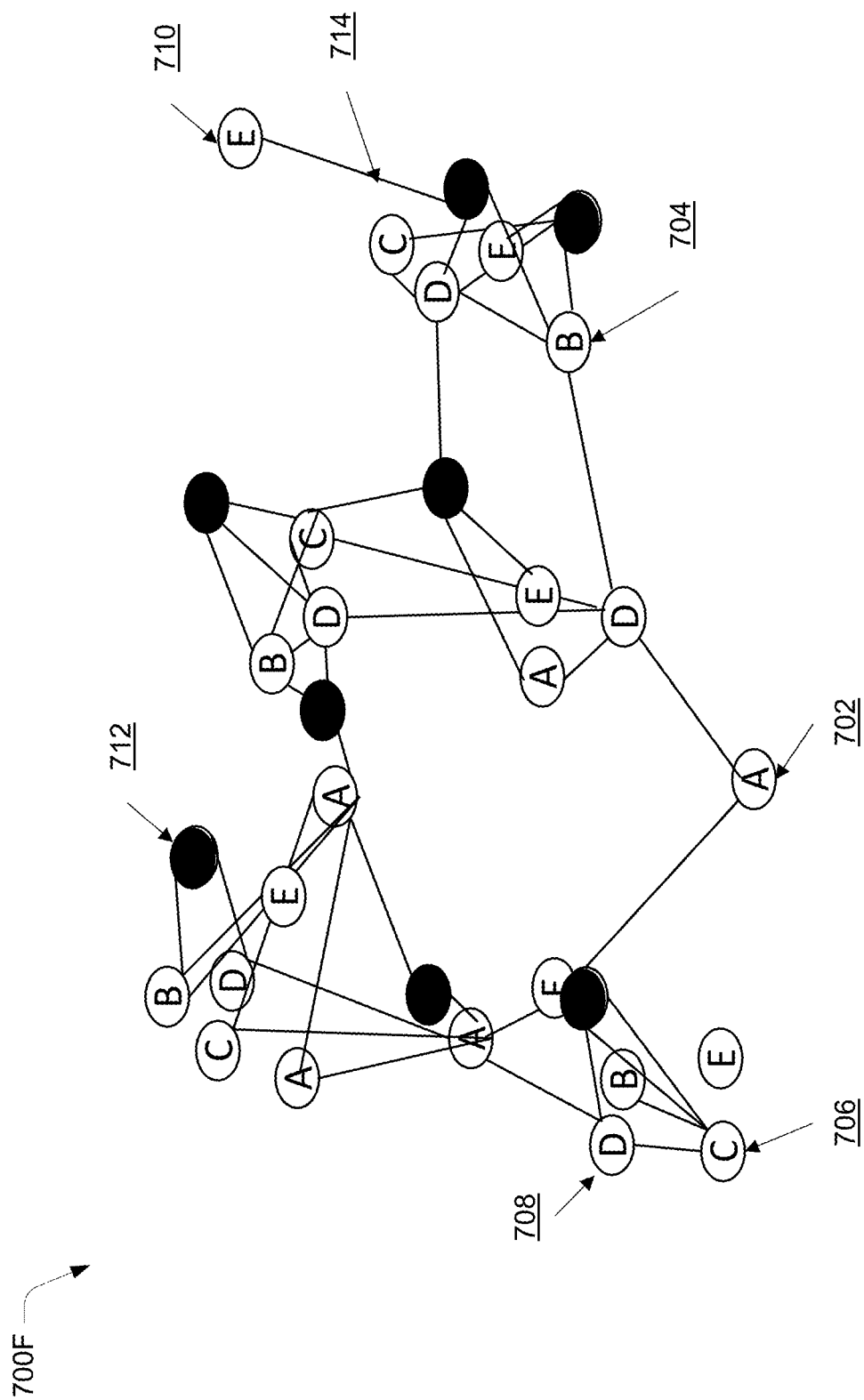
FIG. 7F illustrates a diagram for a node graph generation process for network user cluster prediction based on the density-based network prediction and optimization system, according to an example embodiment of the present disclosure.

FIG. 7F illustrates a diagram for a generation of the node graph 255 process 700F for network user cluster prediction based on the density-based network prediction and optimization system, according to an example embodiment of the present disclosure. Any of the components of the system 110 may be deployed to carry out the steps described by way of the process 700F. FIG. 7F may illustrate an exemplary embodiment of the node graph 255. The node graph 255 may include a plurality of mapped connected 714. The details above the plurality of mapped connections 260 have been described by way of FIG. 2 and are not mentioned herein for sake of brevity and technical clarity.

Figure 7G:
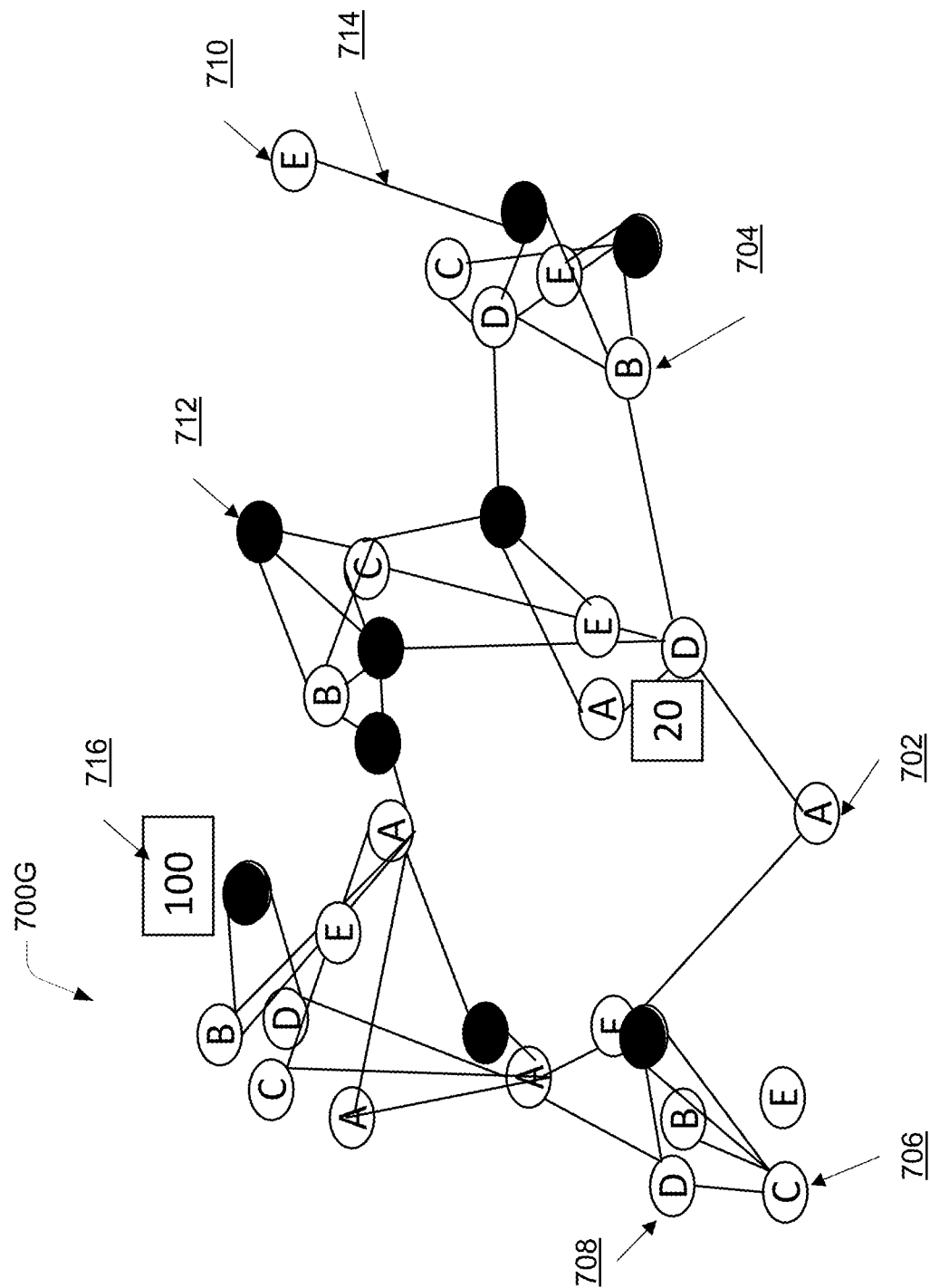
FIG. 7G illustrates a diagram for a map confidence index generation process from the node graph for network user cluster prediction based on the density-based network prediction and optimization system, according to an example embodiment of the present disclosure.

FIG. 7G illustrates a diagram for a map confidence index 265 generation process 700G from the node graph 255 for network user cluster prediction based on the density-based network prediction and optimization system, according to an example embodiment of the present disclosure. Any of the components of the system 110 as illustrated, for example, in FIG. 2 may be deployed to carry out the steps described by way of the process 700G. FIG. 7G illustrates a confidence value 270/716 being attributed to two of the mapped connections from the plurality of mapped connections 260/714. The confidence value 716 may be the same as the confidence value 270 described by the way of FIG. 2. FIG. 7G may illustrate a confidence value 270 as "100" being given to a mapped connection between the black dot and the second projected attribute node conglomerate 706. FIG. 7G may illustrate a confidence value 270 as "20" being given to a mapped connection between the node conglomerate 702 and the second projected attribute node conglomerate 706. As also mentioned above, the confidence value 270 may be higher for each of the plurality of mapped connections 260 associated with the constraint attributes and the confidence value 270 may be lower for each of the plurality of mapped connections 260 associated with other projected attributes.

FIG. 7H illustrates a diagram for a node optimization process 700H for network user cluster prediction based on the density-based network prediction and optimization system, according to an example embodiment of the present disclosure. Any of the components of the system 110 may be deployed to carry out the steps described by way of the process 700H. As mentioned above, the node graph 255 may be iteratively modified by the node optimizer 150 until the node optimization threshold value 275 may be achieved. In an example, the purpose of the iterative modification of the node graph 255 may be to determine the black dots 712 with the strongest connections from the plurality of mapped connections 260. In an example, the system 110 may deploy a Markov chain approach as described by way of FIG. 2 to get to a final relaxation state of the node graph 255. In an example, the final relaxation state of the node graph 255 may be the generation of the harmonized node graph 255.

Figure 7I:
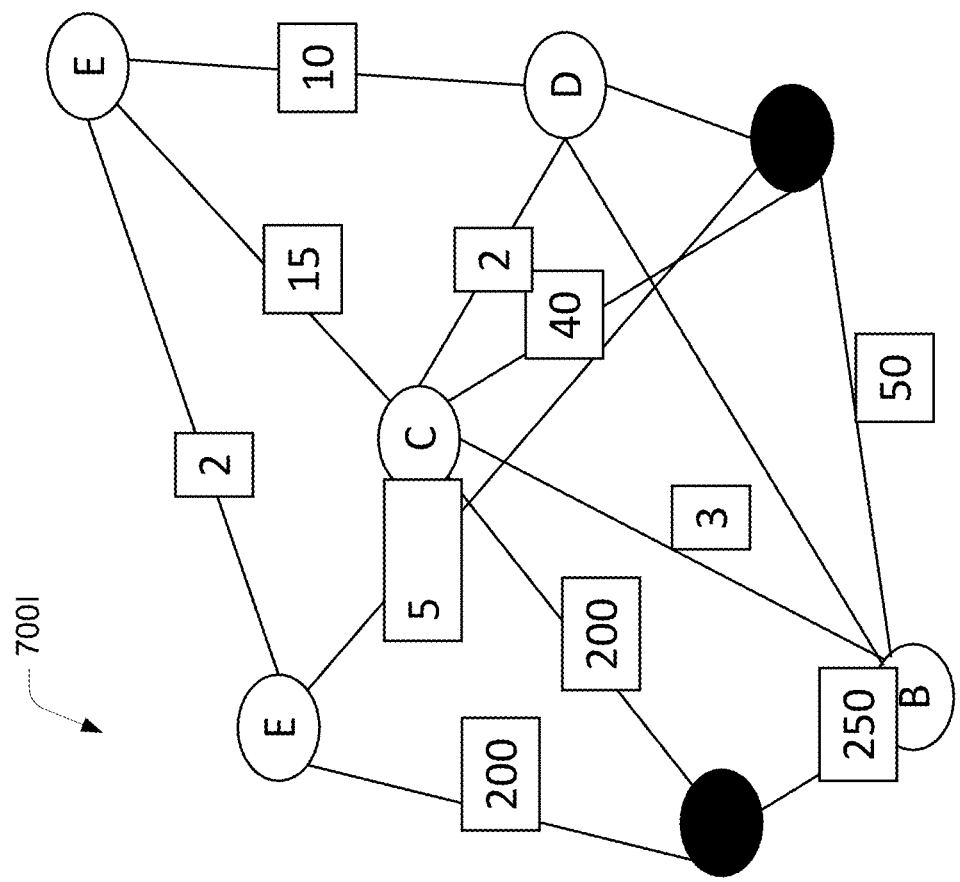
FIG. 7I illustrates a diagram for illustrating an iteration in the node graph through the node optimization process for network user cluster prediction based on the density-based network prediction and optimization system, according to an example embodiment of the present disclosure.

FIG. 7I illustrates a diagram for illustrating an iteration 700I in the node graph 255 through the node optimization process for network user cluster prediction based on the density-based network prediction and optimization system, according to an example embodiment of the present disclosure. Any of the components of the system 110 may be deployed to carry out the steps described by way of the process 700I. FIG. 7I may illustrate an exemplary embodiment of the harmonized node graph 255. The harmonized node graph 255 may be determined after several iterations from the of the Markov chain. The confidence value 270 assigned to each of the mapped connection from the plurality of mapped connections 260 may be strongest. The nodes present in the harmonized node graph 255 may be given prioritization in the actual on-ground network build-out.

Figure 8:
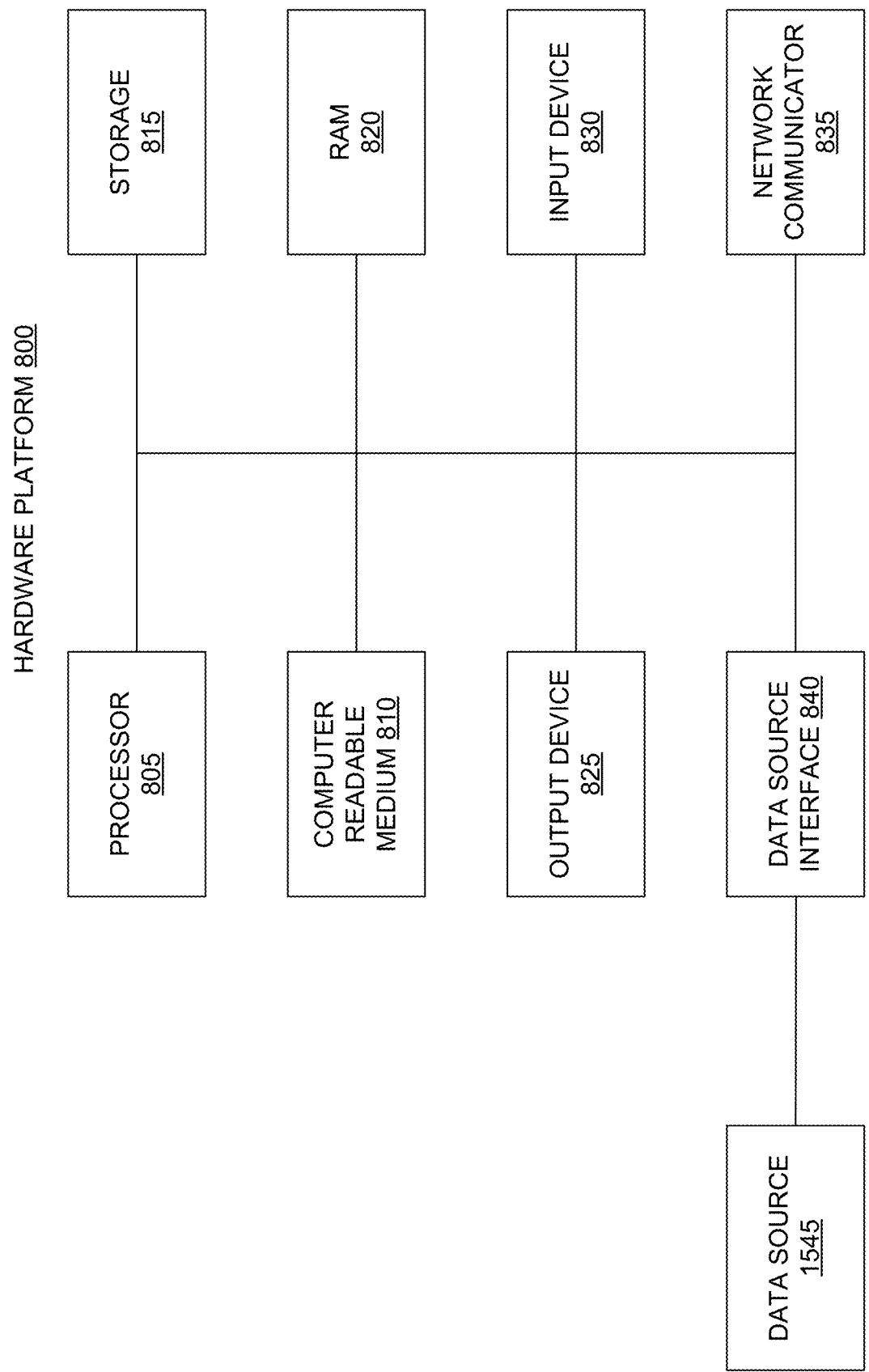
FIG. 8 illustrates a hardware platform for the implementation of the system, according to an example embodiment of the present disclosure.

FIG. 8 illustrates a hardware platform 800 for implementation of the system 110, according to an example embodiment of the present disclosure. Particularly, computing machines such as but not limited to internal/external server clusters, quantum computers, desktops, laptops, smartphones, tablets and wearables which may be used to execute the system 110 or may have the structure of the hardware platform 800. The hardware platform 800 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over FIG. 8, the hardware platform 800 may be a computer system 800 that may be used with the examples described herein. The computer system 800 may represent a computational platform that includes components that may be in a server or another computer system. The computer system 800 may execute, by a processor (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 800 may include a processor 805 that executes software instructions or code stored on a non-transitory computer-readable storage medium 810 to perform methods of the present disclosure. The software code includes, for example, instructions to gather data and documents and analyze documents. In an example, the data analyzer 130, the node analyzer 140 and the node optimizer 150 may be software codes or components performing these steps.

The instructions on the computer-readable storage medium 810 are read and stored the instructions in storage 815 or in random access memory (RAM) 820. The storage 815 provides a large space for keeping static data where at least some instructions could be stored for later execution. The stored instructions may be further compiled to generate other representations of the instructions and dynamically stored in the RAM 820. The processor 805 reads instructions from the RAM 820 and performs actions as instructed.

The computer system 800 further includes an output device 825 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 800 further includes input device 830 to provide a user or another device with mechanisms for entering data and/or otherwise interact with the computer system 800. The input device may include, for example, a keyboard, a keypad, a mouse, or a touchscreen. In an example, the output of the node analyzer 140 is displayed on the output device 825. Each of these output devices 825 and input devices 830 could be joined by one or more additional peripherals. In an example, the output device 825 may be used to display the results of the cluster prediction requirement 210 210.

A network communicator 835 may be provided to connect the computer system 800 to a network and in turn to other devices connected to the network including other clients, servers, data stores, and interfaces, for instance. A network communicator 835 may include, for example, a network adapter such as a LAN adapter or a wireless adapter. The computer system 800 includes a data source interface 840 to access data source 845. A data source is an information resource. As an example, a database of exceptions and rules may be a data source. Moreover, knowledge repositories and curated data may be other examples of data sources. In an example, the first dataset 215 215 and the second dataset 230 230 may be the data source 845.

Figure 9A:
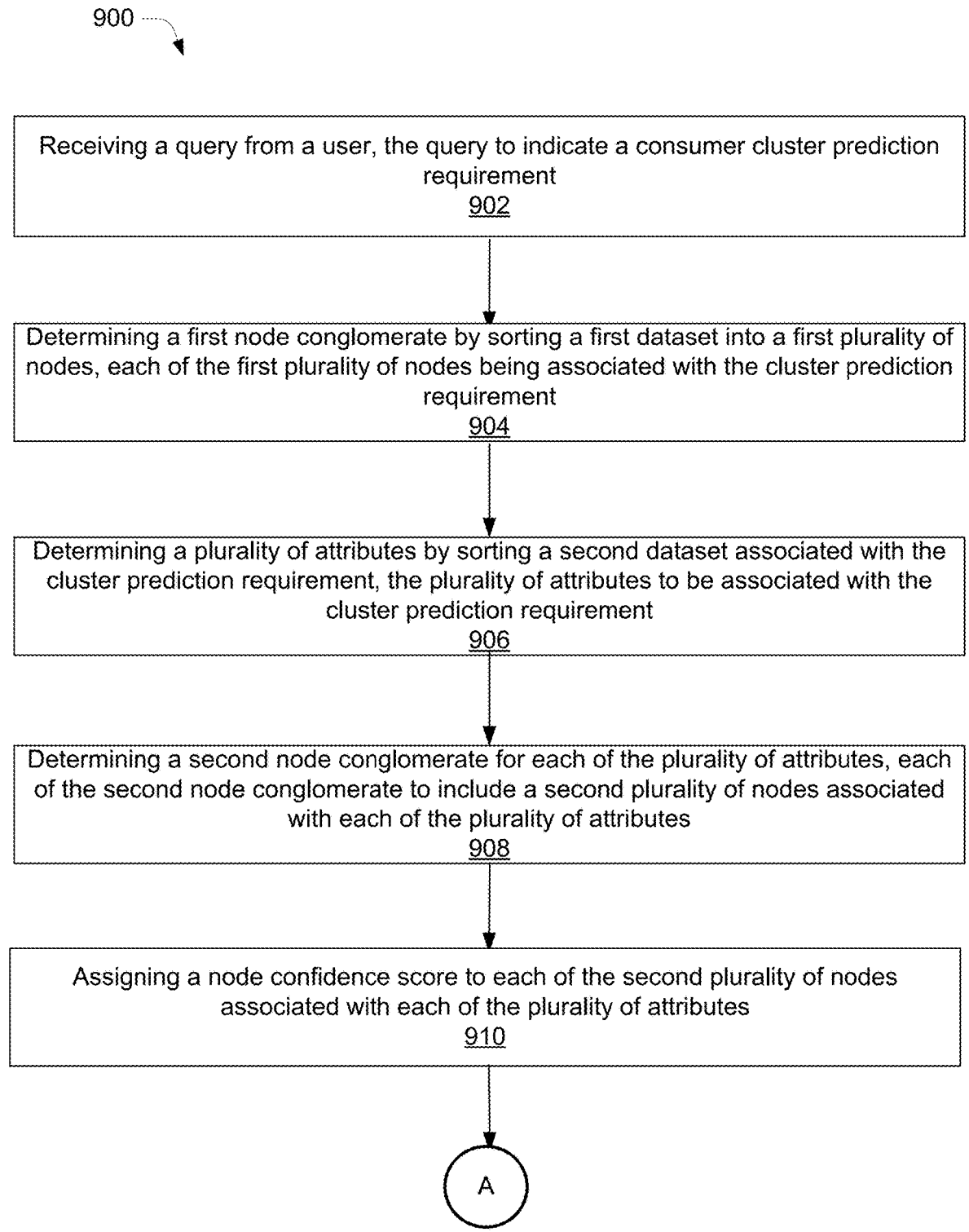
FIGS. 9A and 9B illustrate a process flowchart for the density-based network prediction and optimization system, according to an example embodiment of the present disclosure.
Figure 9B:
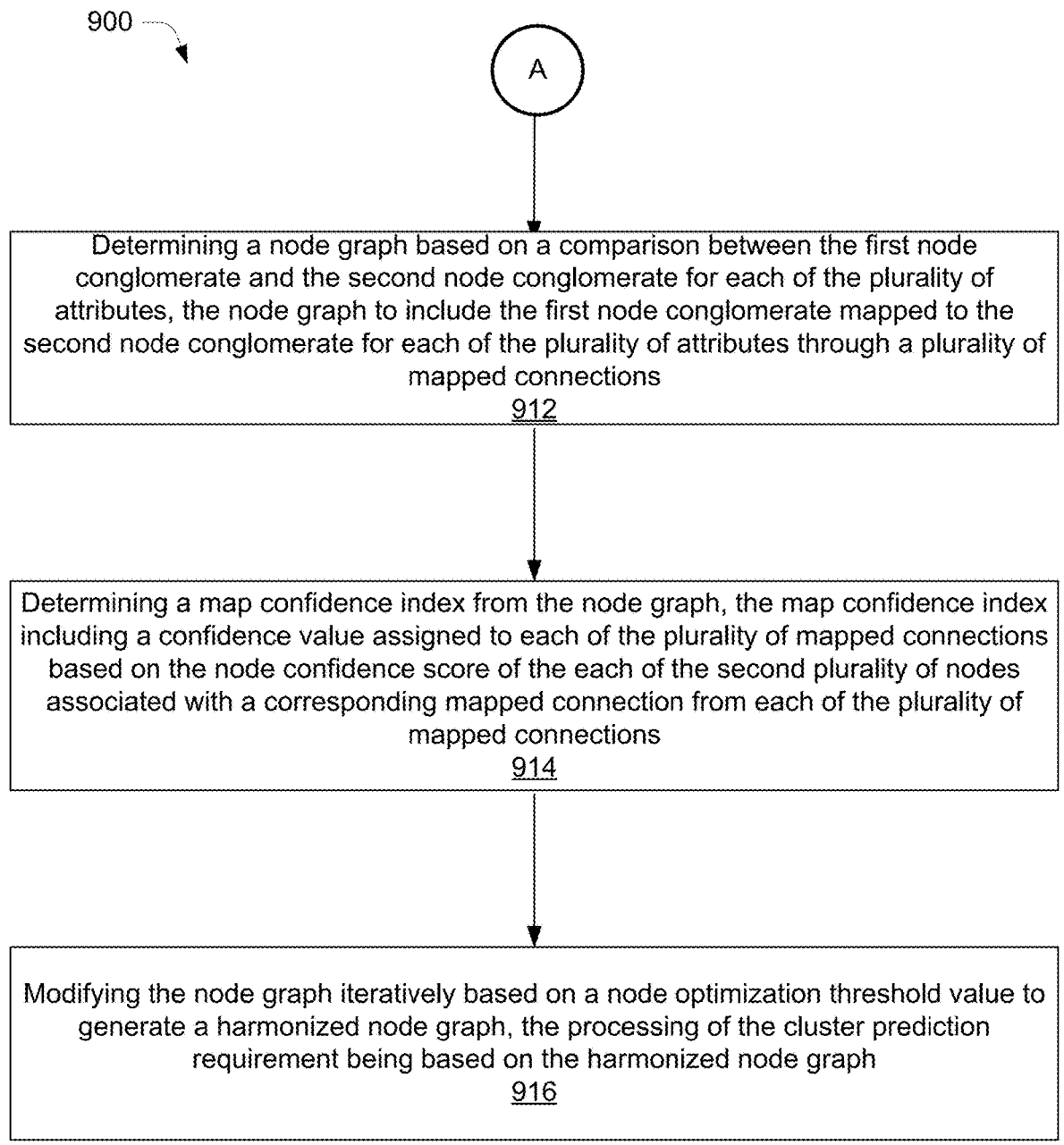

FIGS. 9A and 9B illustrate a method 900 for the density-based network prediction and optimization system 110 according to an example embodiment of the present disclosure.

It should be understood that method steps are shown here for reference only and other combination of the steps may be possible. Further, the method 900 may contain some steps in addition to the steps shown in FIG. 9. For the sake of brevity, construction and operational features of the system 90 which are explained in detail in the description of FIG. 1, FIG. 2, FIG. 3, FIG. 4, FIG. 5A, FIG. 5B, FIG. 6A, FIG. 6B, FIG. 6C, FIG. 6D, FIG. 7A, FIG. 7B, FIG. 7C, FIG. 7D, FIG. 7E, FIG. 7F, FIG. 7H, FIG. 7I and FIG. 8, are not explained in detail in the description of FIG. 9. The method 900 may be performed by a component of the system 110, such as the processor 120, the data analyzer 130, the node analyzer 140 and the node optimizer 150.

At block 902, a query may be received from a user. The query may be the query to indicate the cluster prediction requirement 210 210.

At block 904, the first node conglomerate 220 may be determined by sorting a first dataset 215 into a first plurality of nodes 225. In an example, each of the first plurality of nodes 225 may be associated with the cluster prediction requirement 210 210.

At block 906, the plurality of attributes 235 may be determined by sorting a second dataset 230 associated with the cluster prediction requirement 210 210. The plurality of attributes 235 may be associated with the cluster prediction requirement 210 210. In an example, the method 900 may further comprise predicting at least one of the attributes from the plurality of attributes 235 of the second dataset 230 to generate a set of predicted plurality of attributes 235. The set of predicted plurality of attributes 235 may be considered as a unit of the plurality of attributes 235 sorted from the second dataset 230.

At block 908, the second node conglomerate 240 may be determined for each of the plurality of attributes 235. In an example, each of the second node conglomerate 240 may include a second plurality of nodes 245 associated with each of the plurality of attributes 235.

At block 910, the node confidence score 250 may be assigned to each of the second plurality of nodes 245 associated with each of the plurality of attributes 235.

At block 912, the node graph 255 may be determined based on a comparison between the first node conglomerate 220 and the second node conglomerate 240 for each of the plurality of attributes 235. The node graph 255 may include the first node conglomerate 220 mapped to the second node conglomerate 240 for each of the plurality of attributes 235 through a plurality of mapped connections 260. In an example, the method 900 may further comprise generating the harmonized node graph 255 by iteratively modifying the confidence value 270 assigned to each of the plurality of mapped connections 260 until the node optimization threshold value 275 may be achieved.

At block 914, the map confidence index 265 may be determined from the node graph 255. The map confidence index 265 may include a confidence value 270 assigned to each of the plurality of mapped connections 260 based on the node confidence score 250 of the each of the second plurality of nodes 245 associated with a corresponding mapped connection from each of the plurality of mapped connections 260.

At block 916, the node graph 255 may be modified iteratively based on a node optimization threshold value 275 to generate a harmonized node graph 255, the processing of the cluster prediction requirement 210 being based on the harmonized node graph 255.

In an example, the method 900 further comprises modifying, the node confidence score 250 assigned to each of the second plurality of nodes 245 associated with each of the plurality of attributes 235 based on input from the user. In an example, the method 900 may further comprise creating a node graph library by associating the plurality of attributes 235, the second plurality of nodes 245 associated with each of the plurality of attributes 235, the harmonized node graph 255, and the map confidence index 265 with the cluster prediction requirement 210. The method 900 may further comprise deploying the node graph library for validation of the harmonized node graph 255.

In an example, the method 900 may be practiced using a non-transitory computer-readable medium. In an example, the method 900 may be a computer-implemented method.

The present disclosure provides for continuous collection and analysis of information and may also provide relevant recommendations for optimal network coverage while incurring minimal costs. Furthermore, the present disclosure may substantially reduce the time required in planning and executing network upgradation. The present disclosure may also reduce the time spent on labour-intensive analysis for network design, thereby providing a boost in agility, responsiveness, and productivity.

One or ordinary skill in the art will appreciate that techniques consistent with the present disclosure are applicable in other contexts as well without departing from the scope of the disclosure. These may include, for example, determining the locations of new Automatic Teller Machines (ATMs), new schools, new supermarkets, and the like.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
a processor;
a data analyzer coupled to the processor, the data analyzer to:
receive a query from a user, the query to indicate a cluster prediction requirement; and
determine a first node conglomerate by sorting a first dataset into a first plurality of nodes, each of the first plurality of nodes being associated with the cluster prediction requirement;
a node analyzer coupled to the processor, the node analyzer to:
determine a plurality of attributes by sorting a second dataset associated with the cluster prediction requirement, the plurality of attributes to be associated with the cluster prediction requirement;
determine a second node conglomerate for each of the plurality of attributes, each of the second node conglomerate to include a second plurality of nodes associated with each of the plurality of attributes; and
assign a node confidence score to each of the second plurality of nodes associated with each of the plurality of attributes; and
a node optimizer coupled to the processor, the node optimizer to:
determine a node graph based on a comparison between the first node conglomerate and the second node conglomerate for each of the plurality of attributes, the node graph to include the first node conglomerate mapped to the second node conglomerate for each of the plurality of attributes through a plurality of mapped connections;
determine a map confidence index from the node graph, the map confidence index including a confidence value assigned to each of the plurality of mapped connections based on the node confidence score of the each of the second plurality of nodes associated with a corresponding mapped connection from each of the plurality of mapped connections; modify the node graph iteratively based on a node optimization threshold value to generate a harmonized node graph, the processing of the cluster prediction requirement being based on the harmonized node graph; and
create a node graph library, by associating the plurality of attributes, the second plurality of nodes associated with each of the plurality of attributes, the harmonized node graph, and the map confidence index with the cluster prediction requirement.

2. The system as claimed in claim 1, wherein the node analyzer is to modify the node confidence score assigned to each of the second plurality of nodes associated with each of the plurality of attributes based on an input from the user.

3. The system as claimed in claim 1, wherein the node analyzer is to predict at least one of the attributes from the plurality of attributes of the second dataset to generate a set of predicted plurality of attributes.

4. The system as claimed in claim 3, wherein the system is to consider the set of predicted plurality of attributes as a unit of the plurality of attributes sorted from the second dataset.

5. The system as claimed in claim 1, wherein the node optimizer is to generate the harmonized node graph by iteratively modifying the confidence value assigned to each of the plurality of mapped connections until the node optimization threshold value is achieved.

6. The system as claimed in claim 1, wherein the system is to further deploy the node graph library for validation of the harmonized node graph.

7. A method comprising:
receiving, by a processor, a query from a user, the query to indicate a cluster prediction requirement;
determining, by the processor, a first node conglomerate by sorting a first dataset into a first plurality of nodes, each of the first plurality of nodes being associated with the cluster prediction requirement;
determining, by the processor, a plurality of attributes by sorting a second dataset associated with the cluster prediction requirement, the plurality of attributes to be associated with the cluster prediction requirement;
determining, by the processor, a second node conglomerate for each of the plurality of attributes, each of the second node conglomerate to include a second plurality of nodes associated with each of the plurality of attributes;
assigning, by the processor, a node confidence score to each of the second plurality of nodes associated with each of the plurality of attributes;
determining, by the processor, a node graph based on a comparison between the first node conglomerate and the second node conglomerate for each of the plurality of attributes, the node graph to include the first node conglomerate mapped to the second node conglomerate for each of the plurality of attributes through a plurality of mapped connections;
determining, by the processor, a map confidence index from the node graph, the map confidence index including a confidence value assigned to each of the plurality of mapped connections based on the node confidence score of the each of the second plurality of nodes associated with a corresponding mapped connection from each of the plurality of mapped connections;
modifying, by the processor, the node graph iteratively based on a node optimization threshold value to generate a harmonized node graph, the processing of the cluster prediction requirement being based on the harmonized node graph; and
creating, by the processor, a node graph library, by associating the plurality of attributes, the second plurality of nodes associated with each of the plurality of attributes, the harmonized node graph, and the map confidence index with the cluster prediction requirement.

8. The method as claimed in claim 7, wherein the method further comprises modifying, by the processor, the node confidence score assigned to each of the second plurality of nodes associated with each of the plurality of attributes based on an input from the user.

9. The method as claimed in claim 7, wherein the method further comprises predicting, by the processor, at least one of the attributes from the plurality of attributes of the second dataset to generate a set of predicted plurality of attributes.

10. The method as claimed in claim 9, wherein the method further comprises considering, by the processor, the set of predicted plurality of attributes as a unit of the plurality of attributes sorted from the second dataset.

11. The method as claimed in claim 7, wherein the method further comprises generating, by the processor, the harmonized node graph by iteratively modifying the confidence value assigned to each of the plurality of mapped connections until the node optimization threshold value is achieved.

12. The method as claimed in claim 7, wherein the method further comprises deploying, by the processor, the node graph library for validation of the harmonized node graph.

13. A non-transitory computer readable medium including machine readable instructions that are executable by a processor to:
receive a query from a user, the query to indicate a cluster prediction requirement;
determine a first node conglomerate by sorting a first dataset into a first plurality of nodes, each of the first plurality of nodes being associated with the cluster prediction requirement;
determine a plurality of attributes by sorting a second dataset associated with the cluster prediction requirement, the plurality of attributes to be associated with the cluster prediction requirement;
determine a second node conglomerate for each of the plurality of attributes, each of the second node conglomerate to include a second plurality of nodes associated with each of the plurality of attributes;
assign a node confidence score to each of the second plurality of nodes associated with each of the plurality of attributes;
determine a node graph based on a comparison between the first node conglomerate and the second node conglomerate for each of the plurality of attributes, the node graph to include the first node conglomerate mapped to the second node conglomerate for each of the plurality of attributes through a plurality of mapped connections;
determine a map confidence index from the node graph, the map confidence index including a confidence value assigned to each of the plurality of mapped connections based on the node confidence score of the each of the second plurality of nodes associated with a corresponding mapped connection from each of the plurality of mapped connections;
modify the node graph iteratively based on a node optimization threshold value to generate a harmonized node graph, the processing of the cluster prediction requirement being based on the harmonized node graph; and
create a node graph library, by associating the plurality of attributes, the second plurality of nodes associated with each of the plurality of attributes, the harmonized node graph, and the map confidence index with the cluster prediction requirement.

14. The non-transitory computer-readable medium of claim 13, wherein the processor is to modify the node confidence score assigned to each of the second plurality of nodes associated with each of the plurality of attributes based on an input from the user.

15. The non-transitory computer-readable medium of claim 13, wherein the processor is to predict at least one of the attributes from the plurality of attributes of the second dataset to generate a set of predicted plurality of attributes.

16. The non-transitory computer-readable medium of claim 15, wherein the processor is to consider the set of predicted plurality of attributes as a unit of the plurality of attributes sorted from the second dataset.

17. The non-transitory computer-readable medium of claim 13, wherein the processor is to generate the harmonized node graph by iteratively modifying the confidence value assigned to each of the plurality of mapped connections until the node optimization threshold value is achieved.

\* \* \* \* \*